(12) United States Patent
Singh et al.

(10) Patent No.: US 11,651,156 B2
(45) Date of Patent: May 16, 2023

(54) CONTEXTUAL DOCUMENT SUMMARIZATION WITH SEMANTIC INTELLIGENCE

(71) Applicant: Optum Technology, Inc., Eden Prairie, MN (US)

(72) Inventors: Sanjay K. Singh, Bangalore (IN); Anshuman Sinha, Bangalore (IN); Devikiran Ramadas, Bengaluru (IN); Piyush Gupta, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 327 days.

(21) Appl. No.: 16/868,751

(22) Filed: May 7, 2020

(65) Prior Publication Data

US 2021/0350079 A1    Nov. 11, 2021

(51) Int. Cl.
| | |
|---|---|
| *G06F 40/30* | (2020.01) |
| *G06F 40/284* | (2020.01) |
| *G06F 40/242* | (2020.01) |
| *G06F 16/33* | (2019.01) |
| *G06F 16/34* | (2019.01) |

(52) U.S. Cl.
CPC ........ G06F 40/284 (2020.01); G06F 16/3334 (2019.01); G06F 16/345 (2019.01); G06F 40/242 (2020.01); G06F 40/30 (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 5,541,836 A * | 7/1996 | Church | G06F 40/253 704/7 |
| 5,619,410 A | 4/1997 | Emori et al. | |
| 6,256,629 B1 * | 7/2001 | Sproat | G06F 40/216 |
| 6,871,174 B1 * | 3/2005 | Dolan | G06F 16/3344 704/9 |
| 7,707,142 B1 | 4/2010 | Ionescu | |

(Continued)

OTHER PUBLICATIONS

Whaley et al., title={An application of word sense disambiguation to information retrieval}, year={1999}, pp. 1-20. (Year: 1999).*

(Continued)

*Primary Examiner* — Lamont M Spooner
(74) *Attorney, Agent, or Firm* — Alston & Bird LLP

(57) ABSTRACT

There is a need for more effective and efficient document summarization. This need can be addressed by, for example, techniques for contextual summarization using semantic intelligence. In one example, a method includes identifying a plurality of senses associated with a plurality of words in a document; for each word-sense pair, determining a word-sense probability score; determining, based at least in part on each word-sense probability score for a word-sense pair, one or more context buckets for the document and one or more sense buckets for the document; determining, based at least in part on the one or more context buckets for the document and the one or more sense buckets for the document, the contextual summarization of the document; and performing one or more document processing actions based at least in part on the contextual summarization.

17 Claims, 22 Drawing Sheets

(56) References Cited

U.S. PATENT DOCUMENTS

| | | | |
|---|---|---|---|
| 7,809,714 B1 | 10/2010 | Smith | |
| 7,925,610 B2* | 4/2011 | Elbaz | G06N 5/02 706/55 |
| 7,996,379 B1 | 8/2011 | Jain | |
| 8,321,403 B1 | 11/2012 | Wu et al. | |
| 8,463,593 B2 | 6/2013 | Pell et al. | |
| 9,575,936 B2 | 2/2017 | Romano et al. | |
| 10,162,895 B1* | 12/2018 | Brunsman | G06F 40/295 |
| 10,949,452 B2* | 3/2021 | Srinivasan | G06F 40/205 |
| 2002/0194161 A1* | 12/2002 | McNamee | G06F 16/951 |
| 2004/0243388 A1* | 12/2004 | Corman | G06F 40/211 704/1 |
| 2005/0080775 A1* | 4/2005 | Colledge | G06F 16/9535 |
| 2005/0080780 A1* | 4/2005 | Colledge | G06F 16/951 |
| 2007/0136251 A1* | 6/2007 | Colledge | G06F 16/3322 |
| 2007/0143273 A1 | 6/2007 | Knaus et al. | |
| 2009/0094019 A1* | 4/2009 | Snow | G06F 40/268 704/9 |
| 2010/0036829 A1 | 2/2010 | Leyba | |
| 2010/0070448 A1* | 3/2010 | Omoigui | H01L 27/1463 706/55 |
| 2011/0161067 A1* | 6/2011 | Lesher | G06F 40/169 704/E11.001 |
| 2012/0078906 A1* | 3/2012 | Anand | G06Q 10/105 707/E17.089 |
| 2012/0303637 A1 | 11/2012 | Carmel et al. | |
| 2014/0046653 A1* | 2/2014 | Gopalakrishnan | G06N 5/02 704/9 |
| 2014/0350941 A1 | 11/2014 | Zeigler et al. | |
| 2015/0106078 A1 | 4/2015 | Chang | |
| 2015/0310005 A1 | 10/2015 | Ryger et al. | |
| 2015/0356418 A1 | 12/2015 | Yampolska et al. | |
| 2016/0132789 A1 | 5/2016 | Flinn et al. | |
| 2016/0292145 A1* | 10/2016 | Azzi | G06F 40/30 |
| 2017/0286401 A1 | 10/2017 | He et al. | |
| 2017/0371861 A1* | 12/2017 | Barborak | G06N 3/006 |
| 2018/0039690 A1 | 2/2018 | Zhai et al. | |
| 2018/0285576 A1 | 10/2018 | Cannings et al. | |
| 2019/0130025 A1 | 5/2019 | Crudele et al. | |
| 2019/0327331 A1 | 10/2019 | Natarajan et al. | |
| 2021/0192126 A1* | 6/2021 | Gehrmann | G06N 20/00 |
| 2021/0209513 A1* | 7/2021 | Torres | G06N 20/00 |

OTHER PUBLICATIONS

Whaley, title={An application of word sense disambiguation to information retrieval}, 1999, Darthmouth.edu, pp. 1-20 (Year: 1999).*
"About MEDLINE® and PubMed®: The Resources Guide," NIH National Library of Medicine, (article, online), (4 pages). [retrieved from the Internet Aug. 6, 2020]<https://www.nlm.nih.gov/bsd/pmresources.html>.
Agirre, Eneko et al. "Personalizing PageRank For Word Sense Disambiguation," In Proceedings of the 12th Conference of the European Chapter of the ACL (EACL 2009), Mar. 2009, pp. 33-41.
Aronson, Alan R. "Effective Mapping of Biomedical Text To The UMLS Metathesaurus: The MetaMap Program," In Proceedings of the AMIA Symposium, (2001), pp. 17-21. American Medical Informatics Association.
Arora, Pooja, "Semantic Searching and Ranking Of Documents Using Hybrid Learning System and WordNet," International Journal of Advanced Computer Science and Applications, (2011), vol. 3, No. 6, pp. 113-120.
Barth, Lukas et al. "Semantic Word Cloud Representations: Hardness and Approximation Algorithms," arXiv:1311.4778v1 [cs.CG] Nov. 19, 2013, (14 pages).
Bharti, Santosh Kumar et al. "Automatic Keyword Extraction For Text Summarization: A Survey," arXiv preprint arXiv:1704.03242. Apr. 11, 2017, pp. 1-12.
Bhartiya, Divyanshu et al. "A Semantic Approach to Summarization," arXiv preprint arXiv:1406.1203, Jun. 4, 2014, (7 pages).
Cui, Weiwei et al. "Context Preserving Dynamic Word Cloud Visualization," In 2010 IEEE Pacific Visualization Symposium (PacificVis) Mar. 2, 2010, pp. 121-128. IEEE.
Garla, Vijay N. et al. "Knowledge-Based Biomedical Word Sense Disambiguation: An Evaluation and Application To Clinical Document Classification," Journal of the American Medical Informatics Association, vol. 20, No. 5, (2013), pp. 882-886. DOI: 10.1136/amiajnl-2012-001350.
Guo, Daniel (Zhaohan) et al. "Joint Semantic Utterance Classification and Slot Filling With Recursive Neural Networks," In 2014 IEEE Spoken Language Technology Workshop (SLT), Dec. 7, 2014, pp. 554-559, IEEE.
Gutiérrez, Yoan et al., "UMCC_DLSI: Reinforcing A Ranking Algorithm With Sense Frequencies and Multidimensional Semantic Resources To Solve Multilingual Word Sense Disambiguation," In Second Joint Conference on Lexical and Computational Semantics (SEM), vol. 2: Proceedings of the Seventh International Workshop on Semantic Evaluation (SemEval 2013), Jun. 2013, pp. 241-249.
Hawker, Tobias et al. "Improved Default Sense Selection for Word Sense Disambiguation," In Proceedings of the Australasian Language Technology Workshop, (2006), pp. 11-17.
Hemayati, Reza Taghizadeh et al. "Categorizing Search Results Using Wordnet and Wikipedia," In International Conference on Web-Age Information Management, Aug. 18, 2012, pp. 185-197, Springer, Berlin, Heidelberg.
Hung, Chihli et al. "Neural Network Based Document Clustering Using Wordnet Ontologies," International Journal of Hybrid Intelligent Systems, vol. 1, Nos. 3-4, Jan. 2004, pp. 127-142.
McInnes, Bridget T. et al. "Determining The Difficulty Of Word Sense Disambiguation," Journal of Biomedical Informatics, vol. 47, Feb. 1, 2014, pp. 83-90.
Mizera-Pietraszko, Jolanta et al. "Extraction Of Medical Terms For Word Sense Disambiguation Within Multilingual Framework," The Sixth International Conference on Innovative Computing Technology (INTECH), (2016), pp. 478-484, Dublin. DOI: 10.1109/INTECH.2016.7845125.
Wang, Xuerui et al. "Topical N-Grams: Phrase and Topic Discovery, With An Application To Information Retrieval," In Seventh IEEE International Conference On Data Mining (ICDM 2007), Oct. 28, 2007, (10 pages), IEEE.
Wang, Yue et al. "Clinical Word Sense Disambiguation With Interactive Search and Classification," In AMIA Annual Symposium Proceedings 2016, vol. 2016, p. 2062-2071, American Medical Informatics Association.
Wu, Yingcai et al. "Semantic-Preserving Word Clouds By Seam Carving," In Computer Graphics Forum, Eurographics / IEEE Smposium On Visualization, (2011), vol. 30, No. 3, pp. 741-750. Oxford, UK: Blackwell Publishing Ltd. DOI: 10.1111/j.1467-8659.2011.01923.x.
Xu, Jin et al. "Semantic Word Cloud Generation Based On Word Embeddings," 2016 IEEE Pacific Visualization Symposium (PacificVis), (2016) pp. 239-243, Taipei. DOI: 10.1109/PACIFICVIS.2016.7465278.
Lin et al., "A Document Clustering and Ranking System For Exploring MEDLINE Citations," Journal of the American Medical Informatics Association, vol. 14, No. 5, Sep./Oct. 2007, pp. 651-661.
Struder et al., "Exploiting Social Semantics For Multilingual Information Retrieval," Doctoral Theses, Karlsruhe Institute of Technology, Jul. 22, 2011, 209 pages.
Zhu, "Improving Search Engines Via Classification," Doctoral Thesis, University of London, May 2011, 154 pages.

* cited by examiner

700

Patient had a broken arm, severe burns on lower abdomen and legs, back pain and possible spinal damage. He underwent a skin graft procedure for the burns on the left foot with dermatome peeled skin from right foot. He sustained minimal laceration injuries from dermatome. The burn wounds are healing at much slower rate and are contracting more significantly than dermatome wounds. Patient had his leg evaluated for the sensation over dermatome and it revealed a possible lumbar (lower) spine or tail bone injury. Dermatome evaluation on the arm overruled damage to cervical (upper) or thoracic (mid) spine. Manipal is a multi-specialty hospital where patient from in and around Bengaluru visit to receive treatment, its branches are located in multiple corner of the city in the form of small clinics with specific specialization, the clinics upon monitoring the patient condition choose to refer them to specific arm of the Manipal specialty.

FIG. 7

| | | | | | | |
|---|---|---|---|---|---|---|
| a | 0.0264901 | legs | 0.0066225 | underwent | 0.0066225 | them | 0.0066225 |
| abdomen | 0.0066225 | lower | 0.013245 | upper | 0.0066225 | specialty | 0.0066225 |
| orthopedic | 0.0066225 | lumbar | 0.0066225 | with | 0.013245 | clinic | 0.013245 |
| and | 0.0331126 | mid | 0.0066225 | wounds | 0.013245 | | |
| are | 0.0198675 | minimal | 0.0066225 | Manipal | 0.013245 | | |
| arm | 0.0198675 | more | 0.0066225 | is | 0.0066225 | | |
| at | 0.0066225 | much | 0.0066225 | multi-special | 0.0066225 | | |
| back | 0.0066225 | on | 0.0198675 | hospital | 0.0066225 | | |
| bone | 0.0066225 | or | 0.013245 | where | 0.0066225 | | |
| broken | 0.0066225 | over | 0.0066225 | in | 0.0198675 | | |
| burn | 0.0066225 | overruled | 0.0066225 | around | 0.0066225 | | |
| burns | 0.013245 | pain | 0.0066225 | Bengaluru | 0.0066225 | | |
| cervical | 0.0066225 | patient | 0.0331126 | visit | 0.0066225 | | |
| contracting | 0.0066225 | peeled | 0.0066225 | receive | 0.0066225 | | |
| damage | 0.013245 | possible | 0.013245 | treatment | 0.0066225 | | |
| dermatome | 0.0331126 | procedure | 0.0066225 | its | 0.0066225 | | |
| evaluated | 0.0066225 | rate | 0.0066225 | branches | 0.0066225 | | |
| evaluation | 0.0066225 | revealed | 0.0066225 | located | 0.0066225 | | |
| foot | 0.013245 | right | 0.0066225 | multiple | 0.0066225 | | |
| for | 0.013245 | sensation | 0.0066225 | corner | 0.0066225 | | |
| from | 0.0198675 | severe | 0.0066225 | of | 0.0198675 | | |
| graft | 0.0066225 | significantly | 0.0066225 | city | 0.0066225 | | |
| had | 0.013245 | skin | 0.013245 | form | 0.0066225 | | |
| her | 0.0066225 | slower | 0.0066225 | small | 0.0066225 | | |
| healing | 0.0066225 | spinal | 0.0066225 | clinics | 0.013245 | | |
| his | 0.0066225 | spine | 0.013245 | specific | 0.013245 | | |
| injuries | 0.0066225 | sustained | 0.0066225 | specialization | 0.0066225 | | |
| injury | 0.0066225 | tail | 0.0066225 | upon | 0.0066225 | | |
| it | 0.0066225 | than | 0.0066225 | monitoring | 0.0066225 | | |
| laceration | 0.0066225 | the | 0.0662252 | condition | 0.0066225 | | |
| left | 0.0066225 | thoracic | 0.0066225 | choose | 0.0066225 | | |
| leg | 0.0066225 | to | 0.0264901 | refer | 0.0066225 | | |

| | ? | ? | ? | | | | |
|---|---|---|---|---|---|---|---|
| | skin graft | surgery | body part | sensation | procedure | digestive organ | digestion | upper limbs |
| abdomen | 0 | 3.69985E-18 | 2.90449E-07 | 1.9235E-09 | 0 | 0.00662252 | 4.3858E-05 | 0 |
| arm | 0 | 2.42747E-14 | 7.84211E-06 | 1.55804E-07 | 0 | 0 | 0 | 0.019868 |
| broken | 0 | 0 | 0 | 0 | 0 | 0 | 2.4502E-20 | 3.7E-18 |
| burn | 0 | 0 | 0 | 4.38573E-05 | 0 | 0 | 0 | 0 |
| leg | 0 | 0 | 2.90449E-07 | 0 | 0 | 0 | 0 | 0 |
| lower | 0 | 0 | 3.0776E-06 | 4.67629E-10 | 0 | 0 | 0 | 0 |
| patient | 3.631E-05 | 3.63061E-05 | 0 | 0 | 3.631E-05 | 0 | 0 | 0 |
| severe | 0 | 0 | 0 | 5.58678E-16 | 0 | 0 | 0 | 0 |
| back | 0 | 0 | 2.90449E-07 | 8.43603E-14 | 3.7E-18 | 0 | 0 | 0 |
| damage | 0 | 0 | 7.15108E-14 | 0 | 0 | 9.4716E-16 | 0 | 9.47E-16 |
| palm | 0 | 0 | 2.90449E-07 | 2.90449E-07 | 0 | 0 | 0 | 2.9E-07 |
| spine | 0 | 2.32359E-06 | 2.32359E-06 | 0.000175431 | 2.324E-06 | 0 | 0 | 0 |
| clinics | 0.0001754 | 0.013245033 | 0 | 0 | 0 | 0 | 0 | 0 |
| hospital | 4.386E-05 | 0.006622517 | 0 | 0 | 0 | 0 | 0 | 0 |
| ??? | 0 | 0 | 0 | 0 | 0 | 0 | 0 | 0 |
| orthopedic | 0 | 4.38577E-05 | 0 | 0 | 0.0066225 | 0 | 0 | 0 |

| distributors/wieg | equip | support | break | ? | poor | receiver of medical care | stomach | movement | ? |
|---|---|---|---|---|---|---|---|---|---|
| | | | | | | | 0.006623 | 0 | |
| 0.01986755 | 0.019868 | 1.56E-07 | 3.05643E-09 | | 0 | 0 | 0 | 3.4954E-09 | |
| 0 | 0 | 0 | 0.006622517 | | 4.39E-05 | 0 | 0 | 1.2739E-11 | |
| 0 | 0 | 0 | 5.56678E-16 | | 0 | 0 | 2.9E-07 | 0 | |
| 4.38577E-05 | 0 | 1.92E-09 | 1.27384E-11 | | 0 | 0 | 0 | 8.436E-14 | |
| 0 | 0 | 0 | 0 | | 0.000175 | 0 | 0 | 3.076E-08 | |
| 0 | 0 | 0 | 0 | | 0 | 0.033112583 | 0 | 0 | |
| 0 | 0 | 2.9E-07 | 0 | | 0 | 0 | 0 | 4.3858E-05 | |
| 0 | 0 | 0 | 0.013245033 | | 0 | 0 | 1.25E-17 | 0 | |
| 0 | 0 | 0 | 0 | | 0 | 0 | 2.9E-07 | 2.9045E-07 | |
| 0 | 0 | 0 | 2.32359E-06 | | 0 | 0 | 0 | 2.3236E-06 | |
| 0 | 3.08E-08 | 0 | 0 | | 0 | 0 | 0 | 4.076E-10 | |
| 0 | 1.92E-09 | 0 | 0 | | 0 | 0 | 0 | 1.2739E-11 | |
| 0 | 0 | 0 | 0 | | 0 | 0 | 0 | 0 | |

FIG. 14B

| damage due to heat | pain | harm injury | foot | leg | twig | cure/heal | deep cut |
|---|---|---|---|---|---|---|---|
| 0 | 1.9235E-09 | 1.27384E-11 | 3.7E-18 | 3.69985E-18 | 0 | 1.27384E-11 | 5.587E-16 |
| 0 | 1.55804E-07 | 3.09543E-09 | 2.43E-14 | 2.42747E-14 | 7.84211E-06 | 3.09543E-09 | 1.222E-12 |
| 0 | 1.9235E-09 | 2.90449E-07 | 5.59E-16 | 5.58678E-16 | 5.58678E-16 | 5.58678E-16 | 0 |
| 0.006622517 | 1.9235E-09 | 1.27384E-11 | 0 | 0 | 0 | 8.43503E-14 | 0 |
| 0 | 1.9235E-09 | 1.27384E-11 | 0.006623 | 0.006622517 | 4.38577E-05 | 1.27384E-11 | 0 |
| 0 | 0 | 0 | 2.32E-06 | 0 | 0 | 0 | 0 |
| 0 | 0 | 0 | 4.79E-14 | 0 | 0 | 0 | 0 |
| 0 | 1.9235E-09 | 1.9235E-09 | 3.7E-18 | 3.69985E-18 | 0 | 3.69985E-18 | 0 |
| 0.013245033 | 0.000175431 | 4.07629E-10 | 7.15E-14 | 0 | 0 | 4.07629E-10 | 3.078E-08 |
| 4.38577E-05 | 0.006622517 | 4.38577E-05 | 5.59E-16 | 0 | 0 | 0 | 0 |
| 0 | 2.32359E-06 | 2.32359E-06 | 0 | 0 | 0 | 2.32359E-06 | 0 |
| 0 | 0 | 0 | 0 | 0 | 0 | 0 | 0 |
| 0 | 0 | 0 | 0 | 2.90449E-07 | 0 | 0 | 0 |
| 0 | 1.9235E-09 | 0 | 0 | 2.90449E-07 | 0 | 0 | 0 |

FIG. 14C

| lower limbs | person | ? | backbone | branch | hospital | organization | wound | limbs | ? | intense |
|---|---|---|---|---|---|---|---|---|---|---|
| | 3.69985E-18 | | 0 | 0 | 0 | 0 | 1.27384E-11 | 0 | 0 | 0 |
| 0 | 2.42747E-14 | | 4.82E-16 | 0.019888 | 1.56E-07 | 6.15E-11 | 3.09543E-09 | 0.01986755 | 0 | 0 |
| 0 | 1.62267E-22 | | 3.7E18 | 0 | 0 | 0 | 8.43603E-14 | 3.69985E-18 | 0 | 0 |
| 0 | 0 | | 0 | 0 | 0 | 0 | 3.69985E-18 | 0 | 0 | 0.006623 |
| 0.006623 | 0 | | 0 | 0 | 0 | 0 | | 0.006622517 | 0 | 0 |
| 2.32E-06 | 0 | | 0 | 0 | 0 | 0 | 0 | 2.32359E-06 | 0 | 0 |
| 0 | 0.033112583 | | 0 | 0 | 0 | 0 | 0 | 0 | 0 | 0.006623 |
| 0 | 3.69985E-18 | | 1.27E-11 | 0 | 0 | 0 | 1.9235E-09 | 0 | 0 | 0 |
| 0 | 0 | | 0 | 0 | 0 | 0 | 0.000175431 | 9.47162E-16 | 0 | 0 |
| 2.9E-07 | 0 | | 0 | 0 | 0 | 0 | 0 | 5.80897E-07 | 0 | 0.013245 |
| 0 | 0 | | 0.013245 | 0.000175 | 0.013245 | 0.013245 | 3.0776E-08 | 0 | 0 | 0 |
| 0 | 1.25452E-17 | | 0 | 4.39E-05 | 0.006623 | 0.006623 | 1.9235E-09 | 0 | 0 | 0 |
| 0 | 2.45023E-20 | | 0 | 2.32E-05 | 0.013245 | 0.000175 | 0 | 0 | 0 | 0 |
| 0 | 0 | | 0 | 0 | 2.9E-07 | 1.92E-09 | 0 | 0 | 0 | 0 |

FROM FIG. 14C

FIG. 14D

| $Word_1, Word_2, ..., Word_N$ | $Sense_1$ | $Sense_2$ | $Sense_3$ | $Sense_4$ | ....... | $Sense_{n-1}$ | $Sense_n$ |
|---|---|---|---|---|---|---|---|
| $P_{word_1}$ | $p^1$ | $p^2$ | $p^1$ | $p^1$ | —— | 0 | $p^3$ |
| $P_{word_2}$ | 0 | 0 | 0 | 0 | —— | $p^1$ | 0 |
| —— | 1 | 1 | 1 | 1 | 1 | 1 | 1 |
| $P_{word_N}$ | $p^8$ | $p^{n-2}$ | $p^{n-1}$ | $p^1$ | —— | 0 | $p^n$ |

FIG. 19

CONTEXTUAL DOCUMENT SUMMARIZATION WITH SEMANTIC INTELLIGENCE

BACKGROUND

Various embodiments of the present invention address technical challenges related to performing automated document summarization. Various embodiments of the present invention disclose innovative techniques for performing automated document summarization by utilizing contextual information and semantic information.

BRIEF SUMMARY

In general, embodiments of the present invention provide methods, apparatuses, systems, computing devices, computing entities, and/or the like for performing automated contextual document summarization with semantic intelligence. Various embodiments of the present invention disclose techniques for performing automated contextual document summarization with semantic intelligence that utilize at least one of context buckets, sense buckets, word-context-bucket correlation scores, word-sense-bucket correlation scores, per-word sense-context determinations, per-sentence sense-context determinations, per-document sense-context determinations, and/or the like.

In accordance with one aspect, a method is provided. In one embodiment, the method comprises identifying a plurality of senses associated with a plurality of words in the document; for each word-sense pair of a plurality of word-sense pairs that is associated with a word of the plurality of words and a sense of the plurality of senses, determining a word-sense probability score; determining, based at least in part on each word-sense probability score for a word-sense pair of the plurality of word-sense pairs, one or more context buckets for the document and one or more sense buckets for the document, wherein: (i) each context bucket of the one or more context buckets comprises a subset of the plurality of words deemed correlated with one or more context-related senses of the plurality of senses that is associated with the context bucket; and (ii) each sense bucket of the one or more sense buckets comprises a bucketed subset of the plurality of senses deemed correlated across the plurality of senses; determining, based at least in part on the one or more context buckets for the document and the one or more sense buckets for the document, the contextual summarization of the document; and performing one or more document processing actions based at least in part on the contextual summarization.

In accordance with another aspect, a computer program product is provided. The computer program product may comprise at least one computer-readable storage medium having computer-readable program code portions stored therein, the computer-readable program code portions comprising executable portions configured to identify a plurality of senses associated with a plurality of words in the document; for each word-sense pair of a plurality of word-sense pairs that is associated with a word of the plurality of words and a sense of the plurality of senses, determine a word-sense probability score; determine, based at least in part on each word-sense probability score for a word-sense pair of the plurality of word-sense pairs, one or more context buckets for the document and one or more sense buckets for the document, wherein: (i) each context bucket of the one or more context buckets comprises a subset of the plurality of words deemed correlated with one or more context-related senses of the plurality of senses that is associated with the context bucket; and (ii) each sense bucket of the one or more sense buckets comprises a bucketed subset of the plurality of senses deemed correlated across the plurality of senses; determine, based at least in part on the one or more context buckets for the document and the one or more sense buckets for the document, the contextual summarization of the document; and perform one or more document processing actions based at least in part on the contextual summarization.

In accordance with yet another aspect, an apparatus comprising at least one processor and at least one memory, including computer program code, is provided. In one embodiment, the at least one memory and the computer program code may be configured to, with the processor, cause the apparatus to identify a plurality of senses associated with a plurality of words in the document; for each word-sense pair of a plurality of word-sense pairs that is associated with a word of the plurality of words and a sense of the plurality of senses, determine a word-sense probability score; determine, based at least in part on each word-sense probability score for a word-sense pair of the plurality of word-sense pairs, one or more context buckets for the document and one or more sense buckets for the document, wherein: (i) each context bucket of the one or more context buckets comprises a subset of the plurality of words deemed correlated with one or more context-related senses of the plurality of senses that is associated with the context bucket; and (ii) each sense bucket of the one or more sense buckets comprises a bucketed subset of the plurality of senses deemed correlated across the plurality of senses; determine, based at least in part on the one or more context buckets for the document and the one or more sense buckets for the document, the contextual summarization of the document; and perform one or more document processing actions based at least in part on the contextual summarization.

BRIEF DESCRIPTION OF THE DRAWINGS

Figure 1:
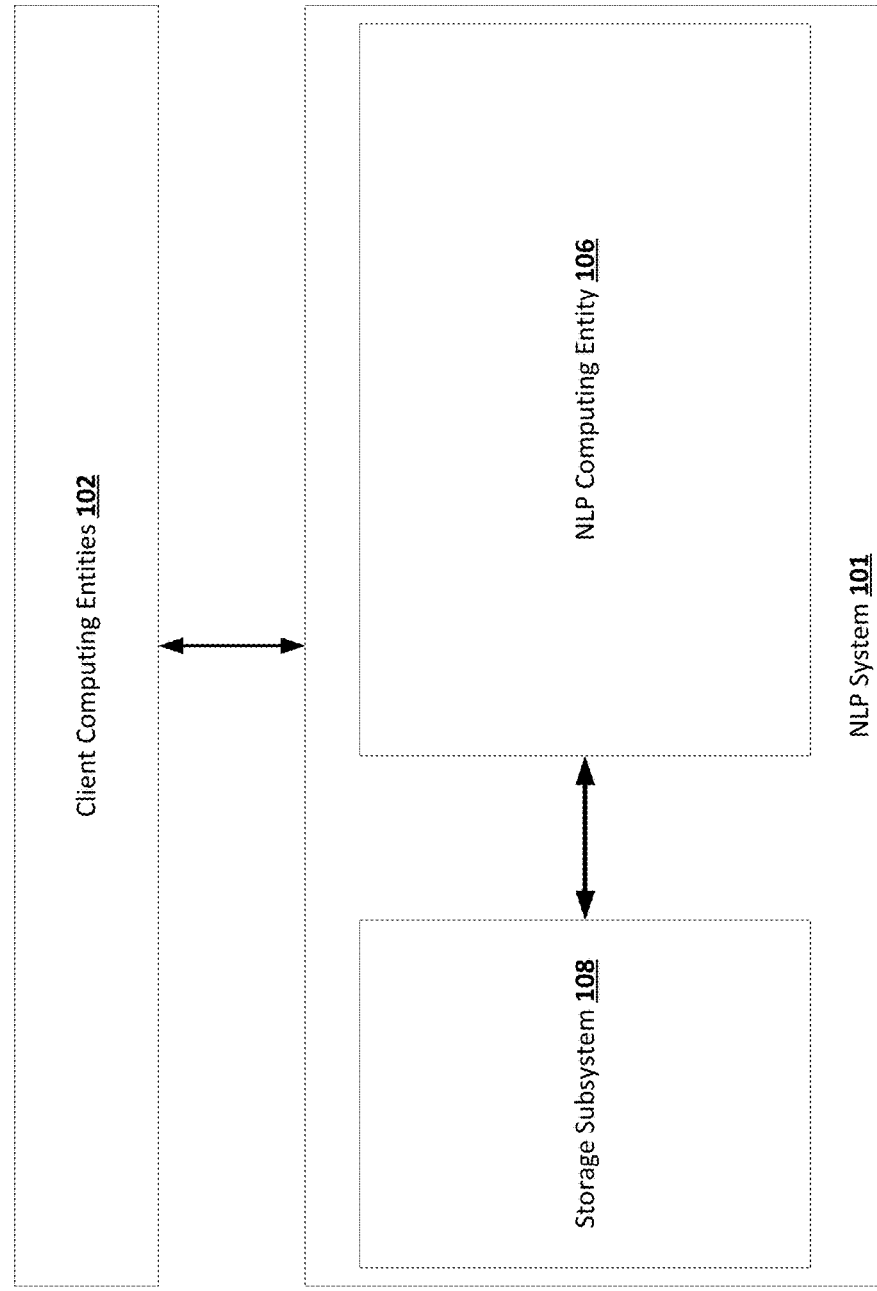

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
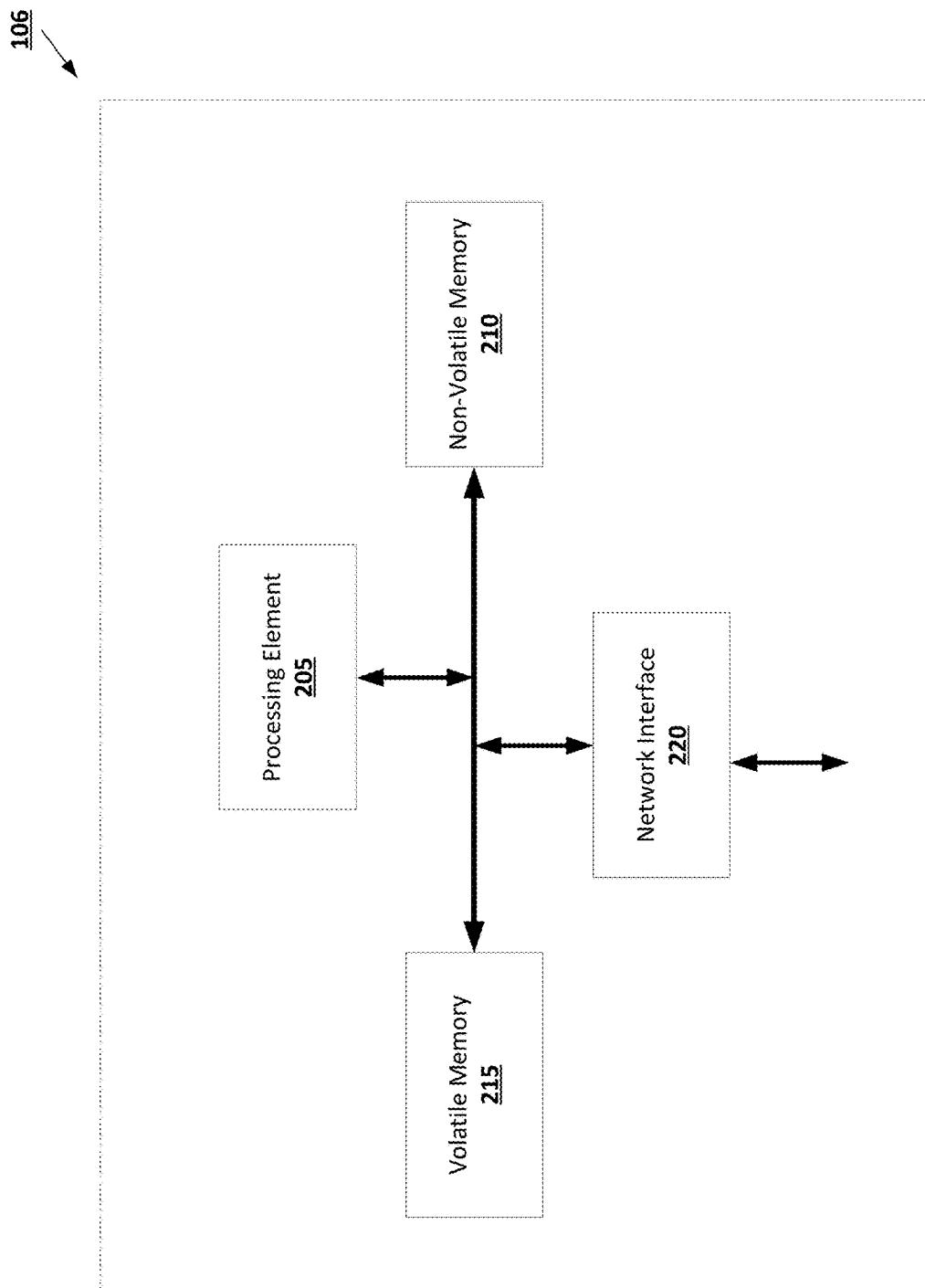

FIG. 2 provides an example NLP computing entity in accordance with some embodiments discussed herein.

Figure 3:
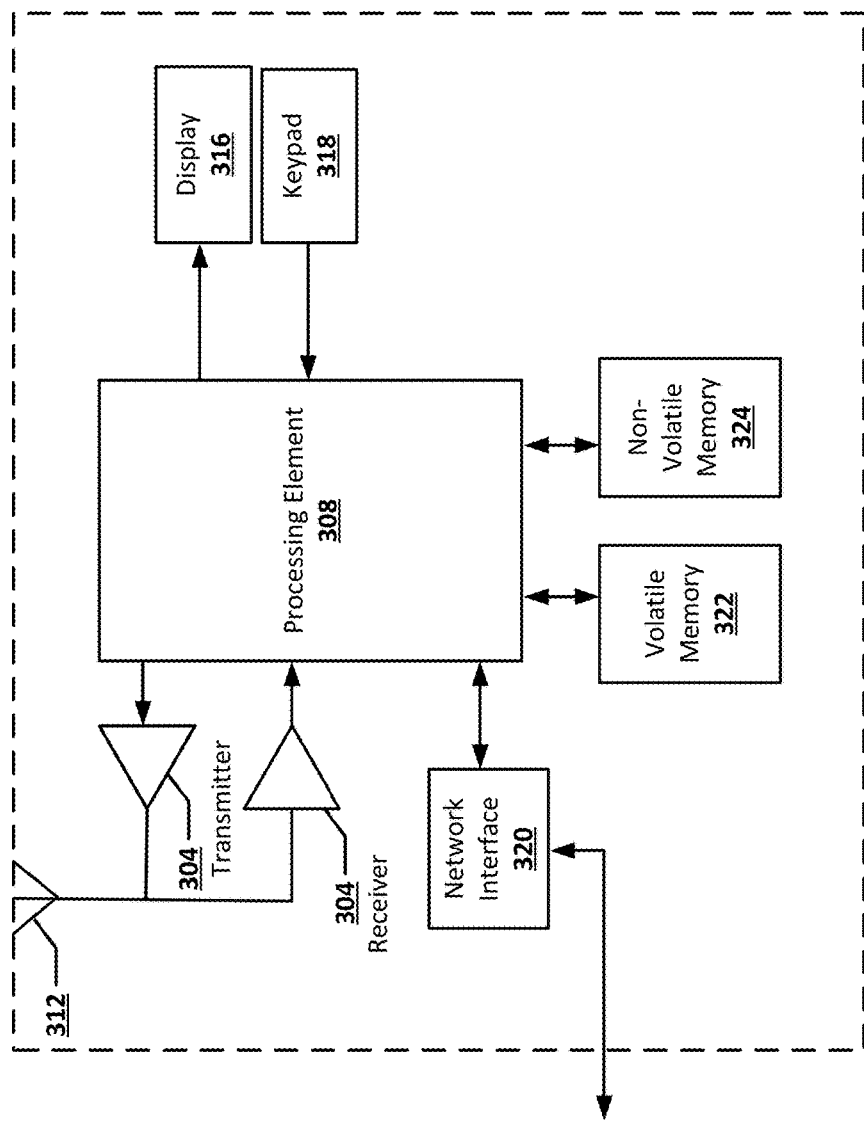

FIG. 3 provides an example client computing entity in accordance with some embodiments discussed herein.

Figure 4:
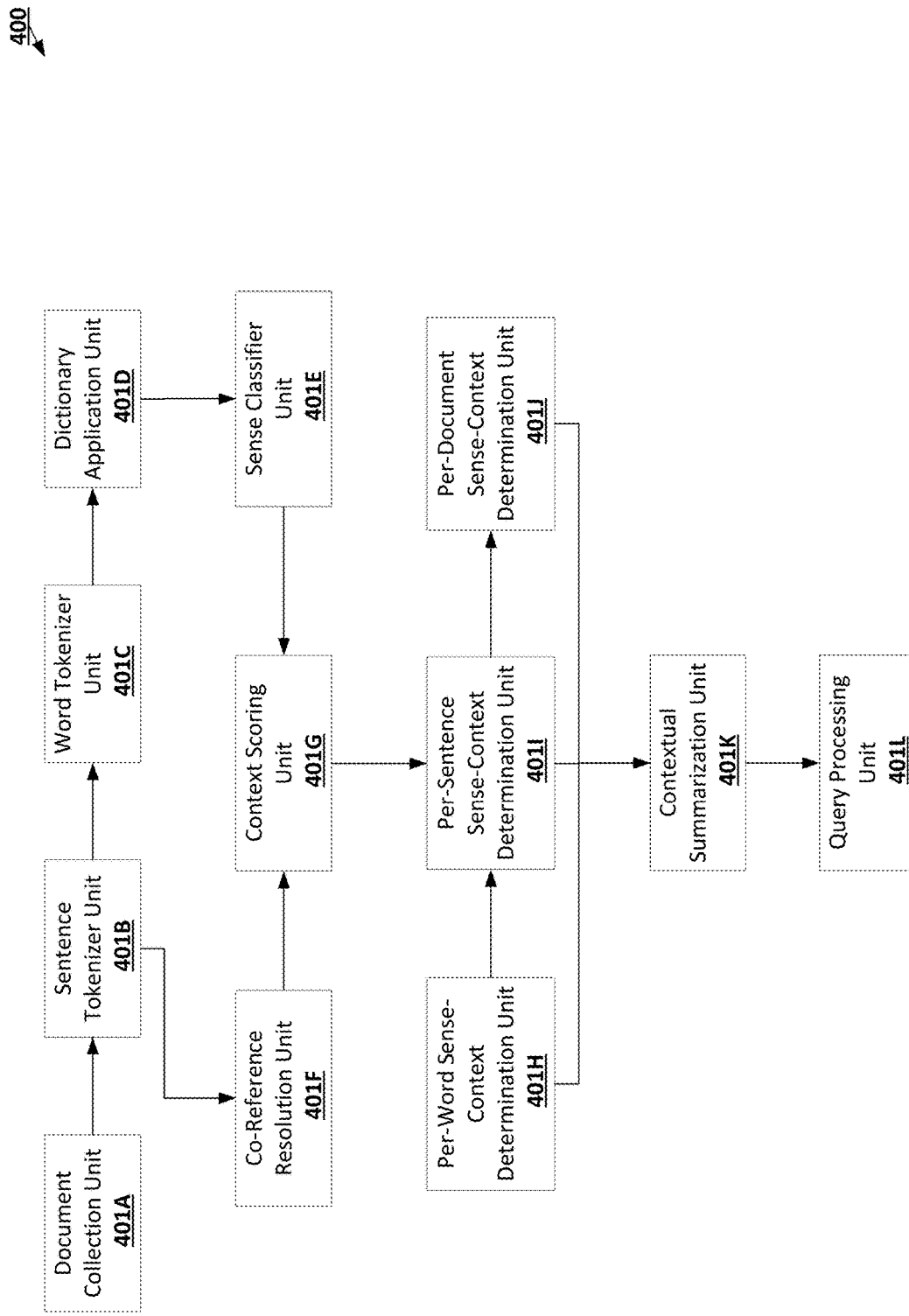

FIG. 4 is a data flow diagram of an example process for performing natural language processing using contextual document summarization in accordance with some embodiments discussed herein.

Figure 5:
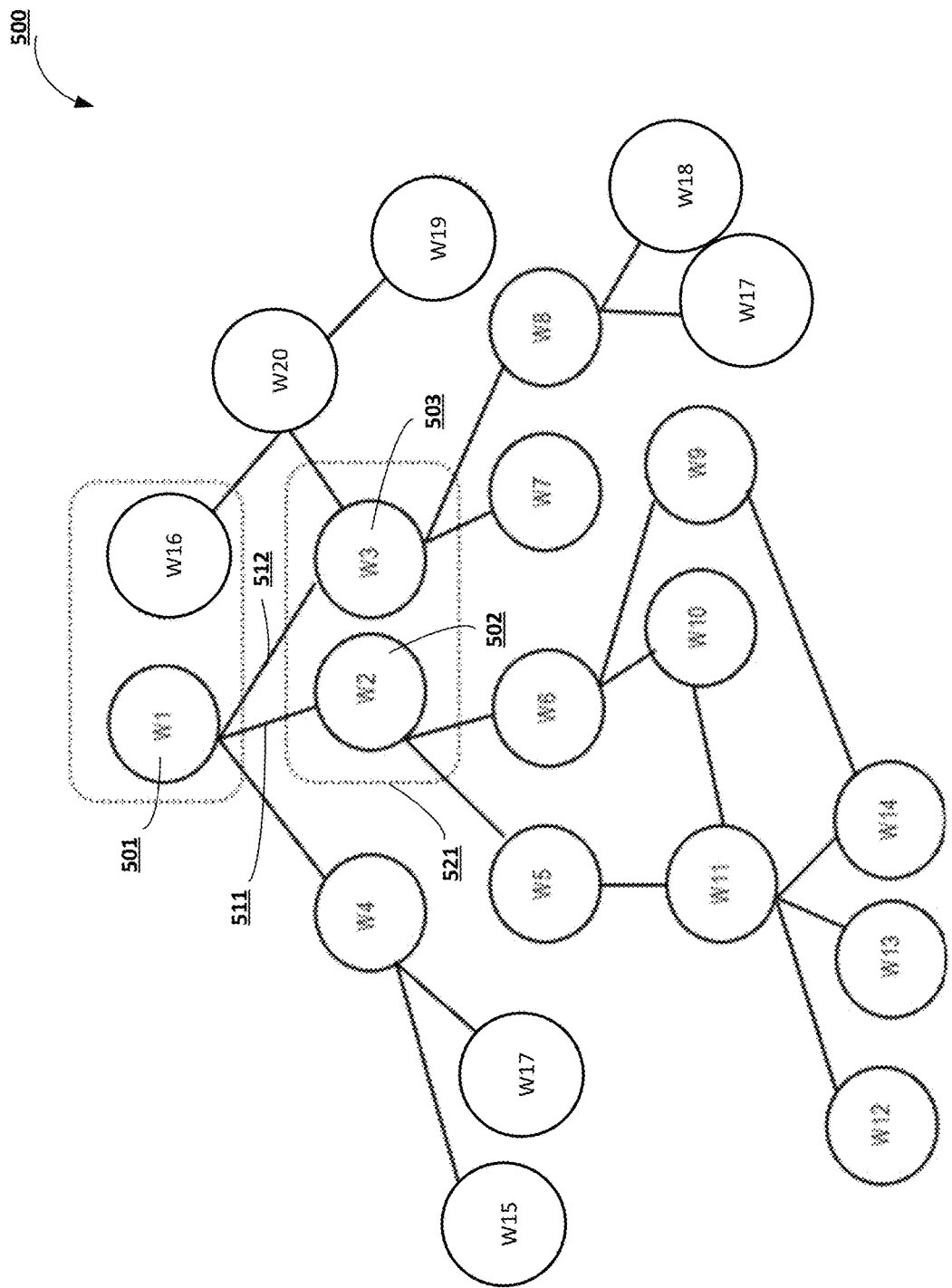

FIG. 5 provides an operational example of a dictionary graph in accordance with some embodiments discussed herein.

Figure 6:
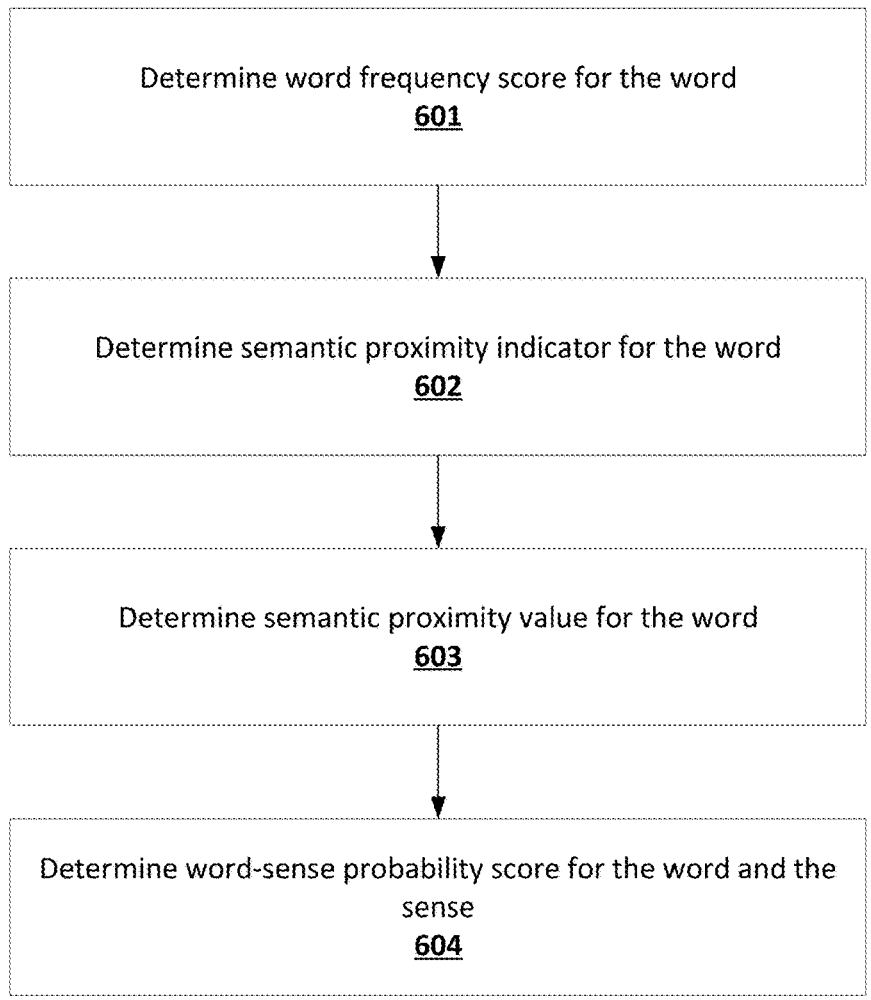

FIG. 6 is a flowchart diagram of an example process for generating a word-sense probability score for a word and a sense in accordance with some embodiments discussed herein.

FIG. 7 provides an operational example of a document data object in accordance with some embodiments discussed herein.

FIG. 8 provides an operational example of a word frequency score data object in accordance with some embodiments discussed herein.

Figure 9:
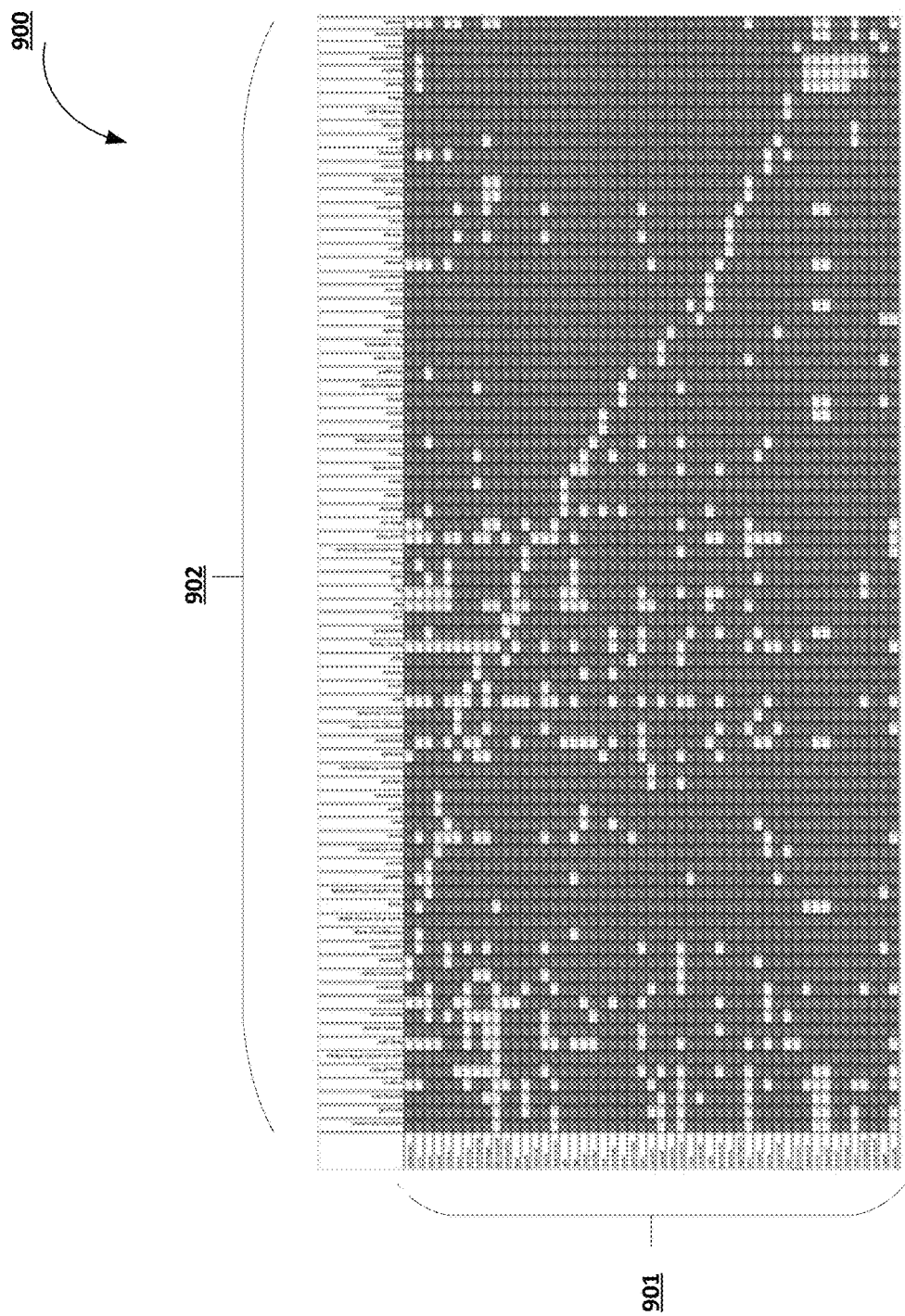

FIG. 9 provides an operational example of a semantic proximity indicator data object in accordance with some embodiments discussed herein.

Figure 10:
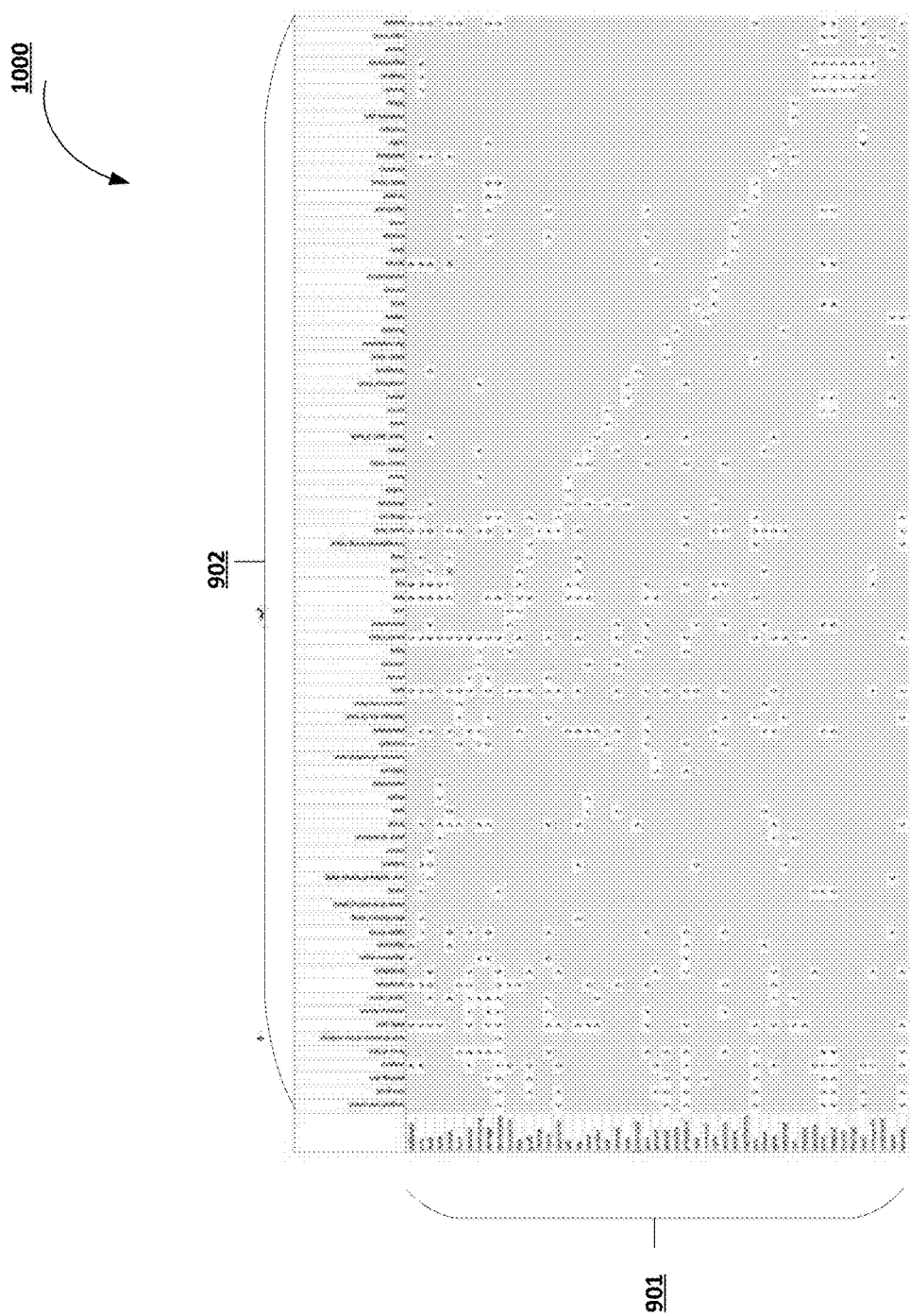

FIG. 10 provides an operational example of a semantic proximity value data object in accordance with some embodiments discussed herein.

Figure 11:
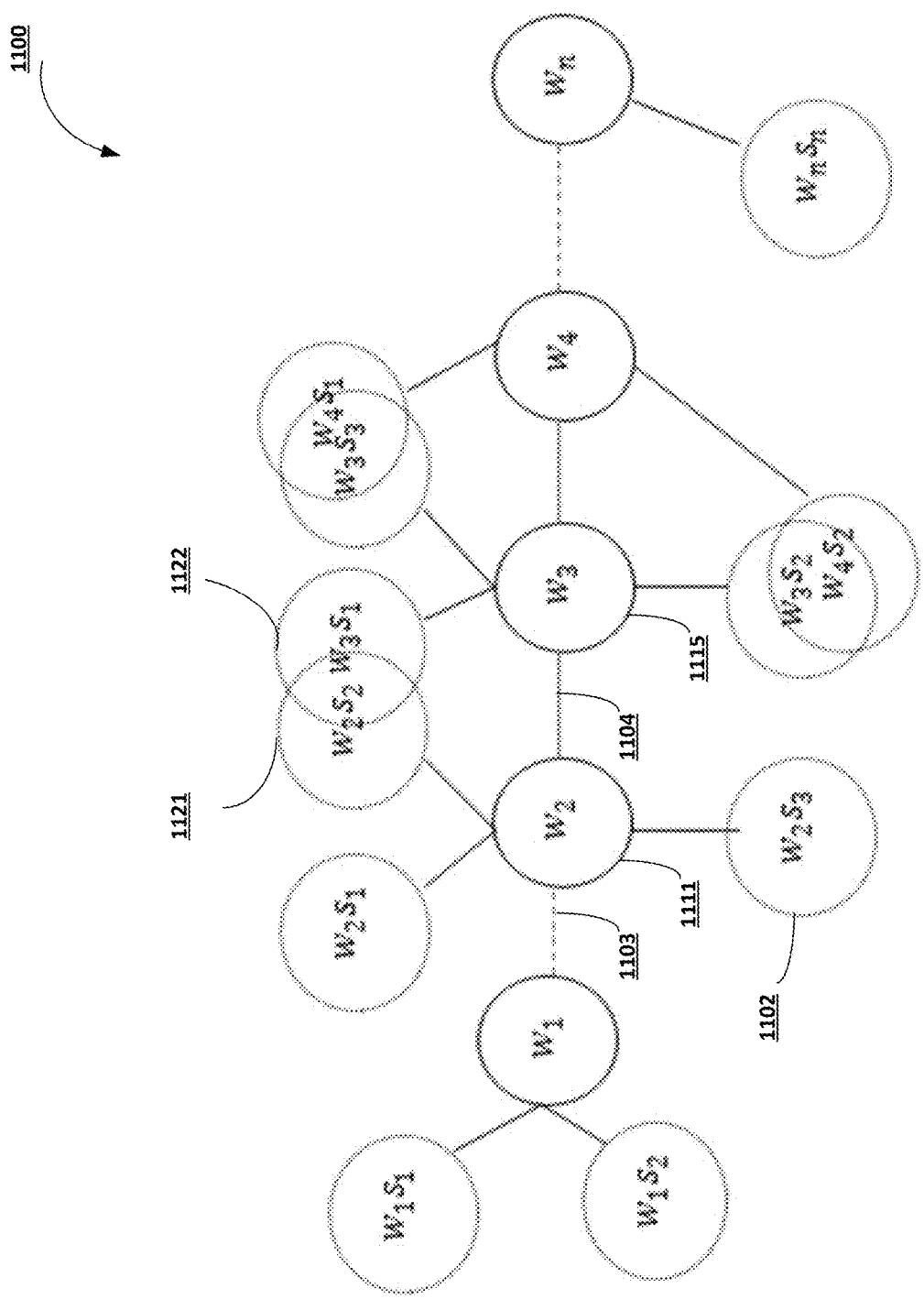

FIG. 11 provides an operational example of a sense overlap graph in accordance with some embodiments discussed herein.

Figure 12:
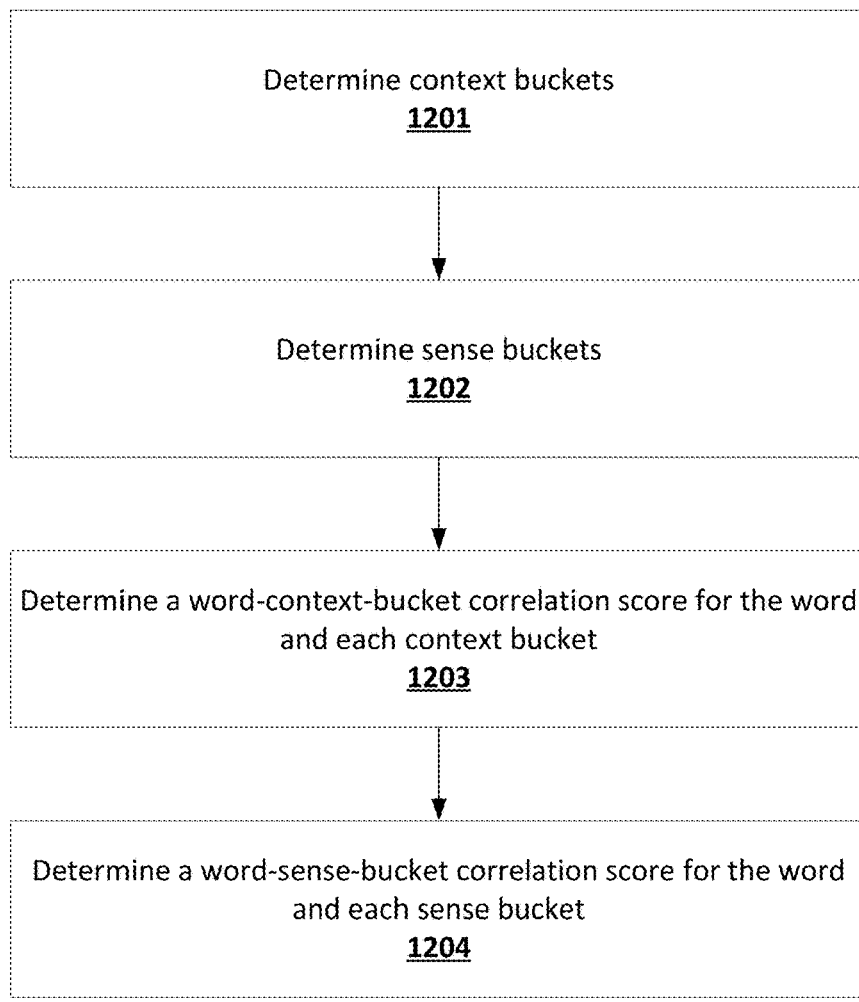

FIG. 12 is a flowchart diagram of an example process for determining sense-context modeling data for a particular word in accordance with some embodiments discussed herein.

Figure 13:
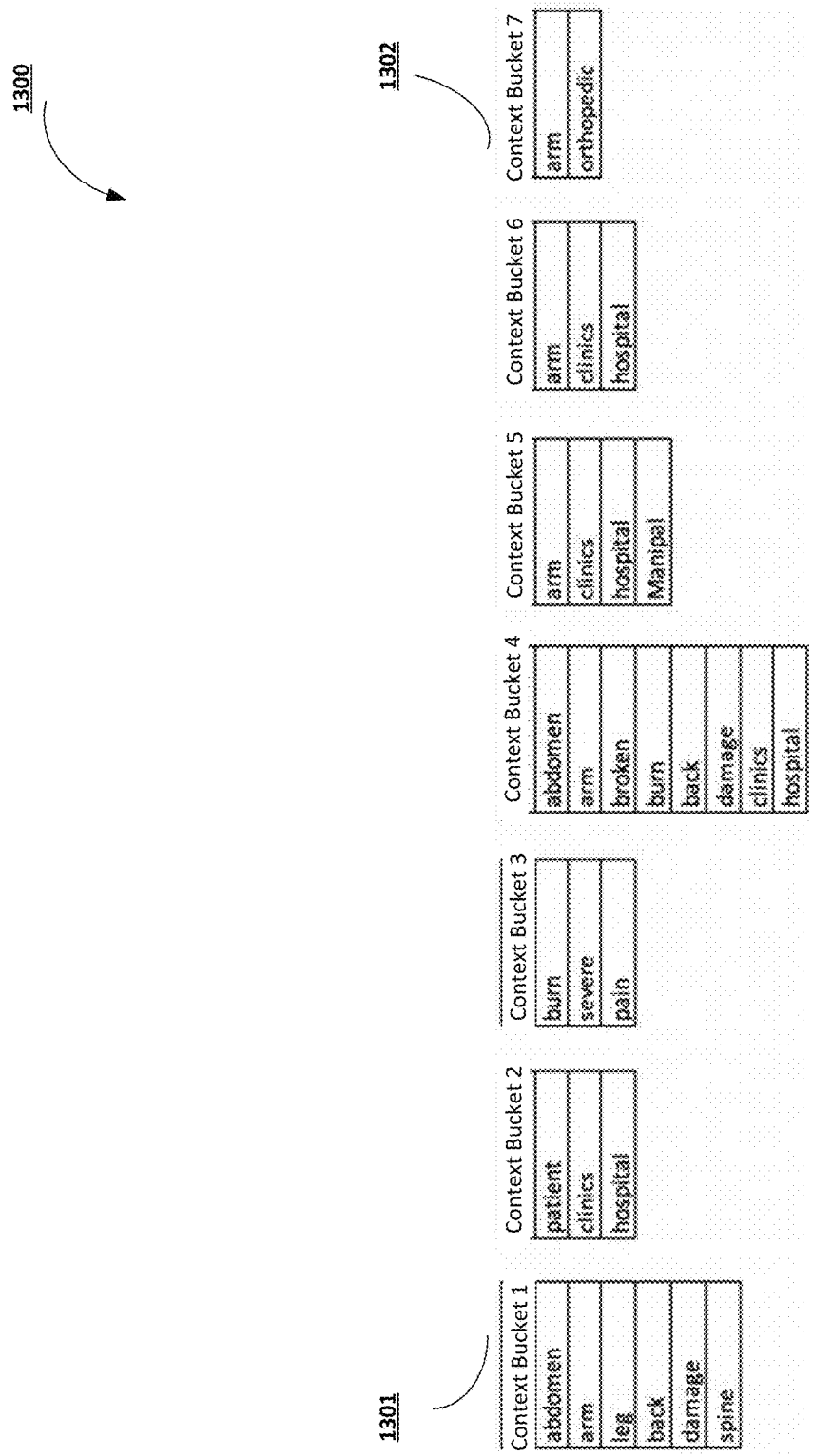

FIG. 13 provides an operational example of various context buckets in accordance with some embodiments discussed herein.

FIGS. 14A, 14B, 14C, and 14D provides an operational example of a sense overlap data object in accordance with some embodiments discussed herein.

Figure 15:
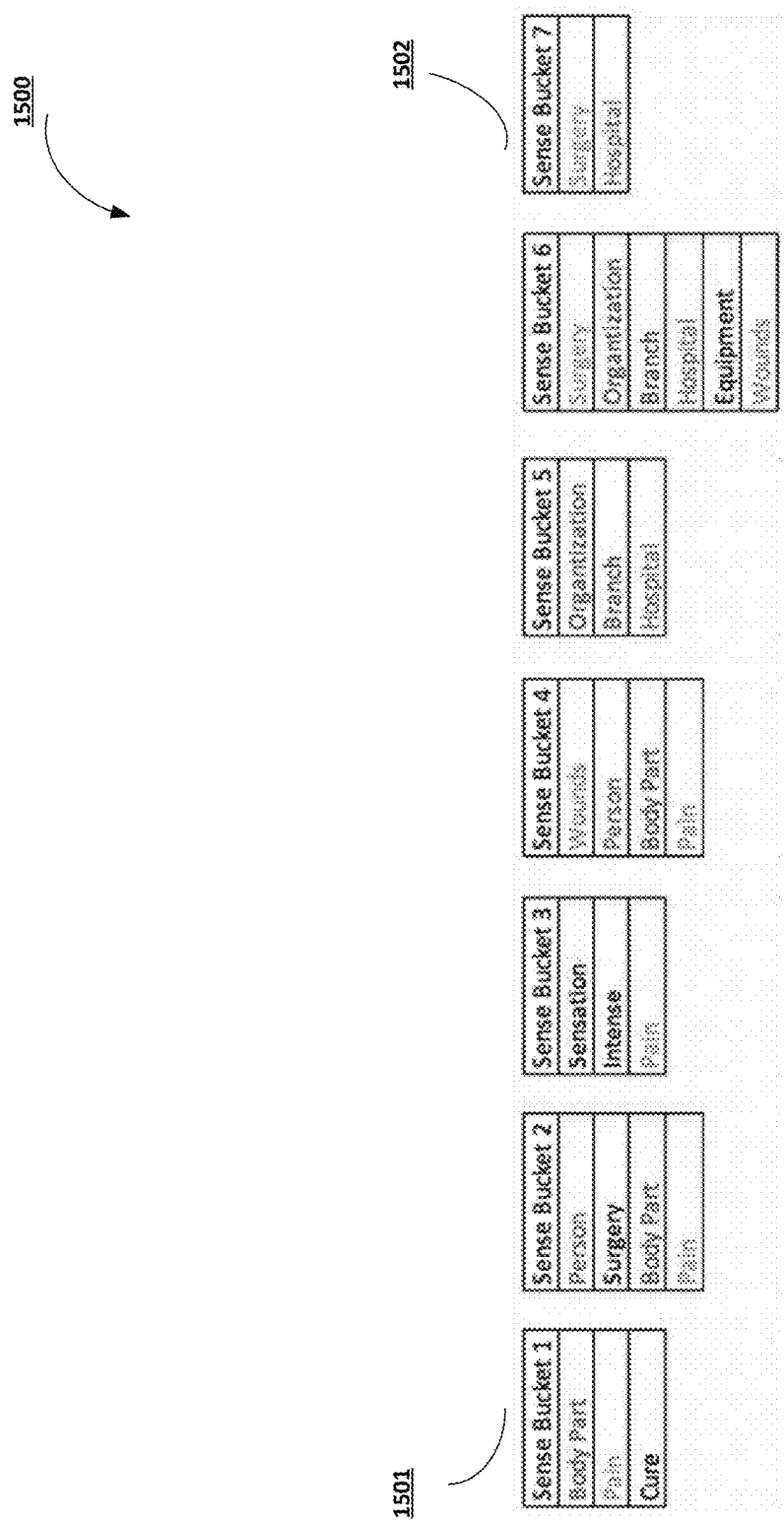

FIG. 15 provides operational examples of various sense buckets in accordance with some embodiments discussed herein.

Figure 16:
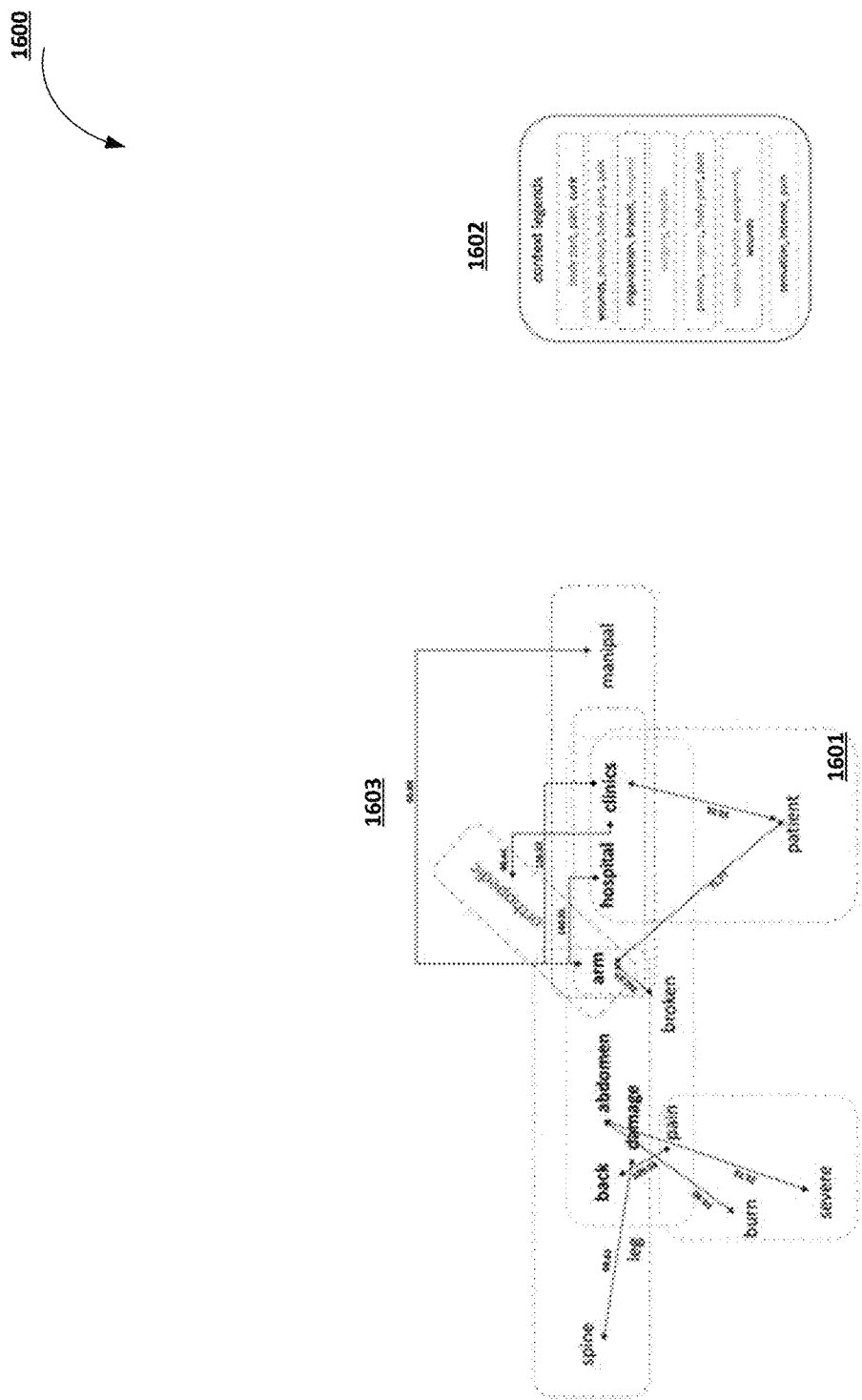

FIG. 16 provides an operational example of a graph-based contextual summarization in accordance with some embodiments discussed herein.

Figure 17:
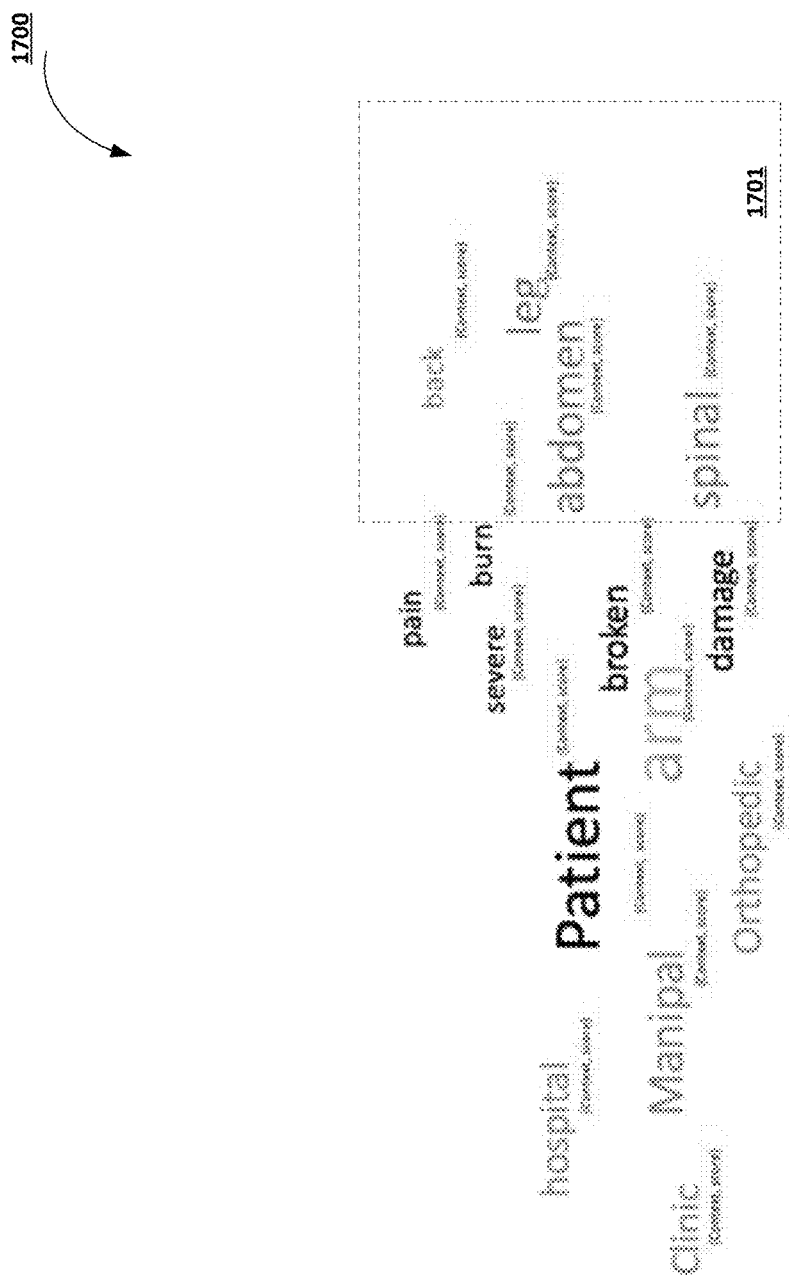

FIG. 17 provides an operational example of a word-cloud-based contextual summarization in accordance with some embodiments discussed herein.

Figure 18:
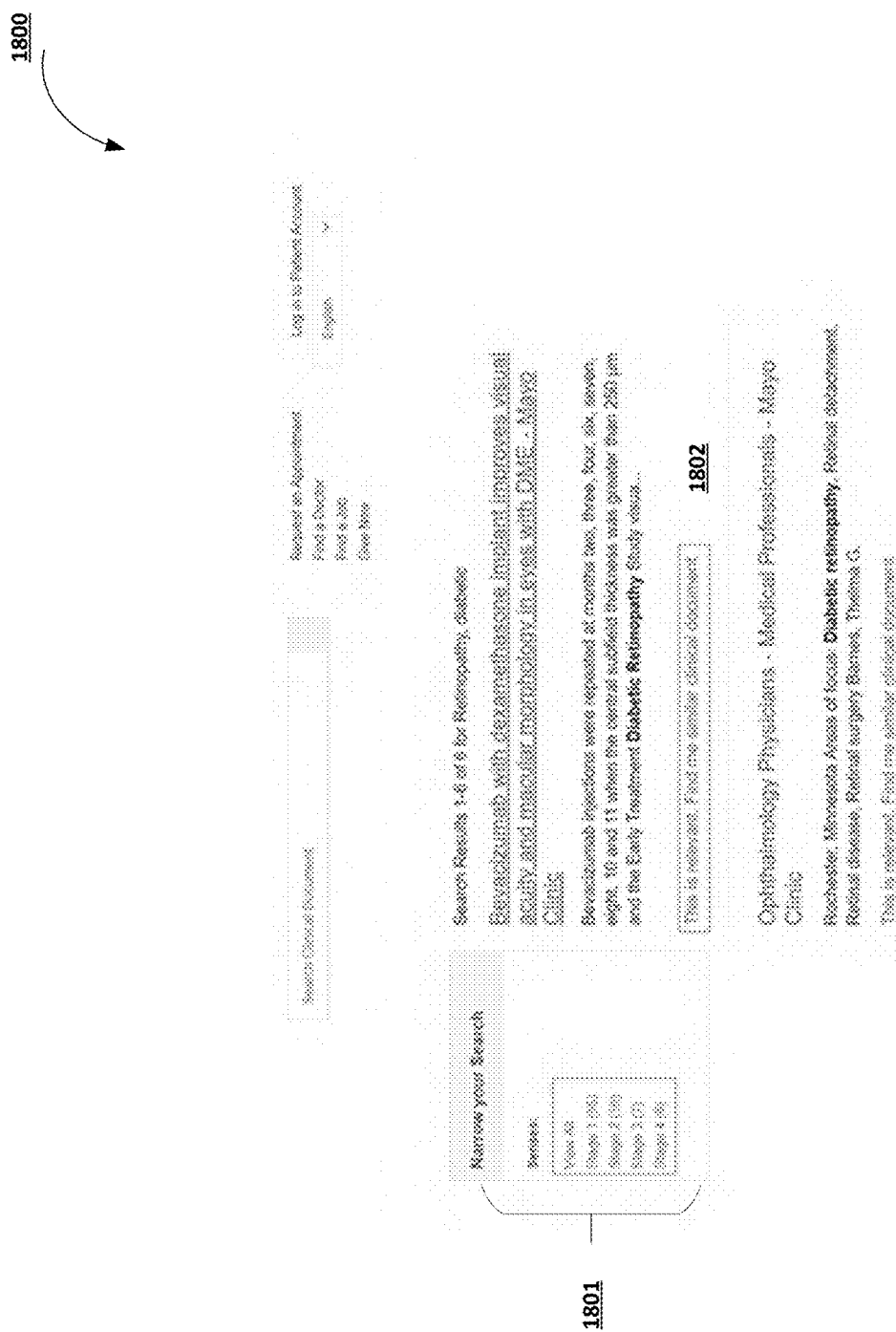

FIG. 18 provides an operational example of a document search query output in accordance with some embodiments discussed herein.

FIG. 19 provides an operational example of a word-sense probability score data object in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address various technical challenges related to performing efficient and effective contextual summarization of digital documents. Many existing document summarization techniques are either highly ineffective in performing desired tasks or rely on machine learning models that are expensive to train and require large amounts of training data before they are able to capture sufficient features and feature processing logic from digital documents that enables them to perform reliably and effective contextual summarization of digital documents. Various aspects of the innovative concepts of the present invention provide modifications to existing techniques for performing document feature extraction and document summarization that can both contribute to effectiveness and semantic adaptability of various existing document summarization solutions and reduce computational costs associated with generating and executing document summarization models.

For example, one aspect of the innovative concepts of the present invention teaches computing a measure of word frequency scores using a logarithmic function that not only behaves in a manner similar to term-frequency inverse-domain-frequency (TF-IDF) measures by penalizing frequently-occurring words, but also avoids the computationally costly computations needed to perform cross-document comparisons in order to calculate TF-IDF measures. By providing an efficient alternative to TF-IDF calculation, the noted aspect of the innovative concepts of the present invention improves effectiveness of performing contextual document summarization in an automated manner.

As another example, a second aspect of the innovative concepts of the present invention teaches reducing extensive and often ambiguous semantic mapping data (e.g., dictionary data) relating two words to each other into one number (e.g., a semantic proximity value) that can be efficiently used to perform semantically intelligent computations without the need to utilize extensive semantic mapping data and/or to train extensive decision tree models to store semantic mappings between words. By providing techniques for reducing semantic feature data captured from large semantic domains, the second aspect of the innovative concepts of the present invention further improves effectiveness of performing contextual document summarization in an automated manner.

As yet another example, a third aspect of the innovative concepts of the present invention teaches using predictive signals provided by relationships between words and senses (e.g., predictive signals provided by context buckets), as well as predictive signals provided by sense overlaps between senses (e.g., predictive signals provided by sense buckets) to model documents in order to generate contextual summarizations of those documents. Experimental results show that combining predictive signals provided by relationships between words and senses and predictive signals provided by sense overlaps between senses can provide a powerful tool for determining both dominant themes of a document and how those themes relate to other documents with semantically equivalent but lexically different vocabulary and expressions. By utilizing such range of predictive signals, the third aspect of the innovative concepts of the present invention further improves reliability of performing contextual document summarization in an automated manner.

Accordingly, by utilizing the above-described techniques and other related techniques, various embodiments of the present invention improve efficiency and reliability of existing document summarization techniques. Moreover, by enabling efficient and effective contextual summarization of digital documents, various embodiments of the present invention make important technical contributions to the fields of document processing and natural language processing (NLP).

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing NLP using contextual summarization of digital documents with semantic intelligence. The architecture 100 includes an NLP system 101 configured to receive document processing queries from the client computing entities 102, process the document processing requests to generate query outputs, and provide the query outputs to the client computing entities 102. Examples of document processing queries include document search queries, document classification queries, document clustering queries, document summarization queries, and/or the like.

In some embodiments, NLP system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The NLP system 101 may include an NLP computing entity 106 and a storage subsystem 108. The NLP computing entity 106 may be configured to process the document processing requests to generate query outputs and provide the query outputs to the client computing entities 102. The storage subsystem 108 may be configured to store at least a portion of input data utilized by the NLP computing entity 106 to perform automated contextual summarization with semantic intelligence. The storage subsystem 108 may further be configured to store at least a portion of configuration data (e.g., model definition data) utilized by the NLP computing entity 106 to perform automated contextual summarization with semantic intelligence.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary NLP Computing Entity

FIG. 2 provides a schematic of an NLP computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the NLP computing entity 106 may include or be in communication with one or more processing elements 205 (also referred to as processors, processing circuitry, and/or similar terms used herein interchangeably) that communicate with other elements within the NLP computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the NLP computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the NLP computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the NLP computing entity 106 with the assistance of the processing element 205 and operating system.

As indicated, in one embodiment, the NLP computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the NLP computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the NLP computing entity 106 may include or be in communication with one or more input elements, such as a keyboard input, a mouse input, a touch screen/display input, motion input, movement input, audio input, pointing device input, joystick input, keypad input, and/or the like. The NLP computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the NLP computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the NLP computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the NLP computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the NLP computing entity 106 and/or various other computing entities.

In another embodiment, the client computing entity 102 may include one or more components or functionality that are the same or similar to those of the NLP computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

Various embodiments of the present invention address various technical challenges related to performing efficient and effective contextual summarization of digital documents. Many existing document summarization techniques are either highly ineffective in performing desired tasks or rely on machine learning models that are expensive to train and require large amounts of training data before they are able to capture sufficient features and feature processing logic from digital documents that enables them to perform reliably and effective contextual summarization of digital documents. Various aspects of the innovative concepts of the present invention provide modifications to existing techniques for performing document feature extraction and document summarization that can both contribute to effectiveness and semantic adaptability of various existing document summarization solutions and reduce computational costs associated with generating and executing document summarization models.

FIG. 4 is a data flow diagram of an example process 400 for performing NLP using contextual summarization of a document. Via the various steps/operations depicted in FIG. 4, an NLP computing entity 106 can efficiently and effectively process cross-document queries by utilizing context-aware comparisons of those documents. While various embodiments of the present invention have been described as generating a contextual summarization of a single document, a person of ordinary skill in the relevant technology will recognize that the disclosed techniques can be used to perform contextual summarization of a corpus of documents in an iterative manner and/or by treating the corpus of documents as one single collection of documents. Moreover, while various embodiments of the present invention describe analyzing properties of unigram words used in documents, a person of ordinary skill in the art will recognize that the disclosed techniques can be used to analyze properties of multi-grams (i.e., n-grams where n>=2) as well as a uni-grams.

The process 400 begins when a document collection unit 401A of the NLP computing entity 106 retrieves a document. The document may be selected from a set of documents that may in turn include medical records, transactional records, financial records, and/or records maintained by an enterprise entity. In some embodiments, the document collection unit 401A (e.g., a web crawler and/or a database management system) retrieves a set of documents from one or more data sources internal or external to a search engine server and stores the set of documents in the document storage unit 112.

In some embodiments, a document may include any collection of one or more data items. In some embodiments, a document includes a string of alphanumeric characters (including, for example, one or more whitespace characters, one or more punctuation-mark characters, and/or one or more symbol characters). For example, the alphanumeric characters may include all of the characters whose encoding is governed by at least one character encoding scheme, such as the American Standard Code for Information Exchange (ASCII) character encoding scheme and/or the Universal Coded Character Set (UCS or Unicode) character encoding scheme.

The process 400 continues when a sentence tokenizer unit 401B of the NLP computing entity 106 tokenizes the document into one or more tokenized sentences. In some embodiments, to tokenize a document into one or more tokenized sentences, the sentence tokenizer unit 401B uses one or more tokenizer software solutions, such as Stanford Tokenizer, OpenNLP, Custom Tokenizer, and/or the like. In some embodiments, to tokenize a document into one or more tokenized sentences, the sentence tokenizer unit 401B may divide the text data associated with the document into one or more portions, where each portion includes a collection of data designated to be a sentence by the presence of one or more preconfigured alphanumeric patterns.

For example, in some embodiments, the sentence tokenizer unit 401B may determine that the presence of m words between two periods indicates that the m words form a sentence if m exceeds a threshold value. In some embodiments, the sentence tokenizer unit 401B tokenizes a document into tokenized sentences by generating sentences that include a combination of up to and including m consecutive words in a document, where each word in the document is associated with one sentence. In this way, tokenizing a document into tokenized sentences may correspond to dividing the words in a document into one or more groups of equal size, where there is a one-to-many relationships between the words and sentences.

The process 400 continues when a word tokenizer unit 401C of the NLP computing entity 106 tokenizes each tokenized sentence into one or more tokenized words. In some embodiments, to tokenize a sentence from a document into one or more tokenized words, the word tokenizer unit 401C uses one or more tokenizer software solutions, such as Stanford Tokenizer, OpenNLP, Custom Tokenizer, and/or the like.

In some embodiments, the word tokenizer unit 401C may detect words within a sentence based at least in part on the presence of one or more preconfigured characters around the word, such as a whitespace character. In some embodiments, by performing sentence tokenization followed by word tokenization, the NLP computing entity 106 generates a tokenized representation for each document, where the tokenized representation for a particular document may define one or more sentences associated with the document, one or more words associated with the document, and the association relationships between the one or more sentences and the one or more words.

The process 400 continues when a dictionary application unit 401D of the NLP computing entity 106 generates semantic proximity data for the set of tokenized words based at least in part on a dictionary representation of a semantic domain (e.g., a linguistic semantic domain, a technical semantic domain, and/or the like) associated with the document. A dictionary representation of a semantic domain may be any data object that describes one or more semantic equivalence relationships between one or more pairs of words associated with the semantic domain, where the semantic equivalence relationships are determined based at least in part on one or more semantic rules characterizing the semantic domain. A dictionary representation may further describe indirect semantic relationships between two words that are connected directly or indirectly to words that have common semantic equivalence relationships with one another.

The semantic proximity data for a set of words may be a data object that describes, (i) for each word in the set of words, the senses of the word up to a threshold degree of sense separation (e.g., up to six degrees of sense separation), and (ii) for each word-sense pair of a word in the set of words and a described sense for the word, a degree of semantic relationship proximity between the word and the described sense based at least in part on the degree of sense separation between the word and the described sense. In some embodiments, to generate the semantic proximity data for the set of tokenized words, the dictionary application unit 401D extracts a subset of the dictionary representation that describe all of the semantic relationships of the set of tokenized words within the threshold degree of sense separation and uses the extracted subset to generate the semantic relationship data.

As used herein, a word that has a semantic equivalence relationship with a tokenized word according to a dictionary representation is a "first-degree sense" of the tokenized word, a word that has a semantic equivalence relationship with a first-degree sense of a tokenized word but not with the tokenized word itself is a "second-degree sense" of the tokenized word, a word that has a semantic equivalence relationship with a second-degree sense of the tokenized word but not with a first-degree sense of the tokenized word or with the tokenized word itself is a "third-degree sense" of the tokenized word, and so on. The graph-wise distance between a word and a sense according to the dictionary representation may be referred to as the degree of separation of the word and the sense.

As described above, in some embodiments, a dictionary representation of a semantic domain is any data object that describes one or more semantic equivalence relationships between one or more pairs of words associated with the semantic domain, where the semantic equivalence relationships are determined based at least in part on one or more semantic rules characterizing the semantic domain. For example, a semantic equivalence relationship described by a dictionary representation associated with a linguistic semantic domain (e.g., the English linguistic semantic domain) may denote that two words associated with the semantic relationship are synonymous given the semantic rules of the noted linguistic semantic domain. As another example, a semantic equivalence relationship described by a dictionary representation associated with a technical semantic domain (e.g., a medical technical semantic domain) may denote that the two words associated with the semantic relationship refer to the same technical phenomenon according to the semantic rules of the noted technical semantic domain. In some embodiments, the dictionary representation includes graph data and/or hashed data.

An operational example of a dictionary graph 500 is presented in FIG. 5. As depicted in FIG. 5, the dictionary graph 500 is an undirected graph including various nodes (e.g., nodes 501, 502, and 503) as well as various edges between the nodes (e.g., the edge 511 between the nodes 501 and 502 and the edge 512 between the nodes 501 and 504). In the dictionary graph 500, a node corresponds to a word in a semantic domain associated with the dictionary graph 500. Moreover, as further depicted in the dictionary graph 500 of FIG. 5, each edge between two nodes in the dictionary graph 500 corresponds to a semantic equivalence relationship between the words associated with the two nodes. In some embodiments, two nodes may have edges to a common node without having a direct edge to one another. For example, a node corresponding to the word "arm" may have edges to the nodes corresponding to the words "limb" and "handle," while the nodes corresponding to the words "limb" and "handle" may not have a direct edge to one another.

By using the dictionary graph 500 of FIG. 5, the dictionary application unit 401D can generate semantic proximity data for a set of tokenized words and a threshold degree of sense separation. For example, if the set of tokenized words includes W4 and W20 and the threshold degree of sense separation is two, the dictionary application unit 401D may generate semantic proximity data that describes: (i) as first-degree senses of W4: W1, W15, W17; (ii) as second-degree senses of W4: W2 and W3; (iii) as first degree senses of W20: W3, W16, and W19; and (iv) as second-degree senses of W20: W1, W7, and W8. For example, the semantic proximity data for the tokenized words W4 and W20 may include a two-dimensional array that includes: (i) as the first value of the first row of the array, the vector [W1, W15, W17]; (ii) as the second value of the first row of the array, the vector [W2, W3]; (iii) as the first value of the second row of the array, the vector [W3, W16, W19]; and (iv) as the second value of the second row of the array, the vector [W1, W7, W8].

The process 400 continues when a sense classifier unit 401E of the NLP computing entity 106 utilizes the semantic proximity data to generate word-sense probability data for the set of tokenized words in accordance with the semantic proximity data. In some embodiments, the word-sense probability data is a data object that describes, for each word-sense pair of a tokenized word and an nth degree sense described by the semantic proximity data, a word-sense probability score. A word-sense probability score for a word and a sense may describe an estimated degree of relationship between the word and the sense given the word frequency score for the word and the semantic proximity value for the word relative to the sense. The sense classifier unit 401E may store word-sense probability scores for a group of words and a group of senses in a word-sense probability score data object, such as the word-sense probability score data object 1900 of FIG. 19.

In some embodiments, to determine a word-sense probability score for a word and a sense, the sense classifier unit 401E performs the steps/operations of the process depicted in FIG. 6. The process depicted in FIG. 6 begins at step/operation 601 when the sense classifier unit 401E determines a word frequency score for the word. A word frequency score may be a data object that describes at least one measure of frequency of a corresponding word in a corresponding set of documents. In some embodiments, the sense classifier unit 401E determines the word frequency score for a particular word in the document obtained by the document collection unit 401A according to the steps/operations described by the equation:

$$p(w_i) = \mathrm{mod}_a\left[\log_b\left(\frac{\sum w_i}{\sum \text{ words}}\right)\right] \quad \text{Equation 1}$$

In Equation 1, $p(w_i)$ is the word frequency score for the word $w_i$ in the particular set of documents, $$\frac{\sum w_i}{\sum \text{ words}}$$

is the occurrence frequency of the word $w_i$ in the particular set of documents, $\Sigma w_i$ is the word count of the word $w_i$ in the particular set of documents, $\Sigma$ words is the total word count in the particular set of documents, b is a parameter of the logarithmic transformation (with an example value of ten), and a is a parameter of the modulo transformation (with an example value of one).

In some embodiments, the word frequency score is determined using a model (e.g., the model depicted in Equation 1) that applies a logarithmic function to a measure of word frequency of a corresponding word in a corresponding set of documents. In some embodiments, application of a logarithmic function causes the more frequent words to have a lower word frequency score relative to the less frequent words. This, in turn, causes the word frequency scores generated by Equation 1 to have the effect of penalizing frequent occurrences of words, thus behaving in a manner similar to TF-IDF without incurring the computational costs associated with the various cross-document frequency comparisons required for TF-IDF calculations.

FIG. 8 depicts an 800 that describes word frequency scores of various words in accordance with the frequency measures depicted in the example document data object 700 of FIG. 7. For example, as depicted in the word frequency score data object 800 of FIG. 8, the word "a" which has been frequently used in the document data object 700 of FIG. 7 has a relatively high term frequency score of 0.264901, while the word "laceration" which has been rarely used in the document data object 700 of FIG. 7 has the relatively low word frequency score 0.0066225.

If step/operation 601 is used to calculate n-gram frequency scores for n>=2, the unigram frequency scores of the unigrams in each n-gram can be combined to generate the noted n-gram frequency score. For example, the sense classifier unit 401E may determine the frequency score for a particular multi-gram consisting of words $\{w_1, w_2 \ldots w_n\}$ in a particular document by performing the steps/operations described by the equation:

$$p(w_1, w_2, \ldots, w_n) = \sum_{i=1}^{n} p_i * \log_c\left[\frac{p(w_1 \cap w_2 \ldots w_n)}{p(w_1) * p(w_2) \ldots p(w_n)}\right] \quad \text{Equation 2}$$

In Equation 2, $p(w_1, w_2 \ldots w_n)$ is the frequency score for the multi-gram consisting of the words $\{w_1, w_2, \ldots, w_n\}$ in the particular document, $\Sigma_{i=1}^{n} p_i$ is a measure of summation of each frequency score associated with a word of the words $\{w_1, w_2, \ldots, w_n\}$ in the particular document, $p(w_1 \cap w_2 \ldots w_n)$ is a measure of joint probability of occurrence associated with a combination of words $\{w_1, w_2, \ldots, w_n\}$ in the particular document, $p(w_1)^* p(w_2) \ldots p(w_n)$ is a measure of product of each frequency score associated with a word of the words $\{w_1, w_2 \ldots w_n\}$ in the particular document, and c is a parameter (with an example value of ten) of a logarithmic transformation of a ratio of the measure of joint probability of occurrence and the measure of product. In some embodiments, the measure of joint probability of occurrence is determined based at least in part on the occurrence frequency of the particular multi-gram consisting of the words $\{w_1, w_2 \ldots w_n\}$ in the particular document.

At step/operation 602, the sense classifier unit 401E determines a semantic proximity indicator for the word and the sense based at least in part on the semantic proximity data. The semantic proximity indicator is a data object that describes whether, according to the semantic proximity data, a corresponding sense associated with the semantic proximity indicator is within a threshold degrees of separation of a corresponding tokenized word associated with the semantic proximity indicator. In some embodiments, the semantic proximity indicator is a measure of whether a corresponding word associated with the semantic proximity indicator and a corresponding sense associated with the semantic proximity indicator are connected according to the semantic proximity data. In some embodiments, the semantic proximity indicator describes whether a degree of sense separation between nodes associated with a corresponding word and a corresponding sense within the dictionary representation satisfies a threshold sense separation criterion.

An operational example of a semantic proximity indicator data object 900 that depicts semantic proximity indicators for a set of words 901 and a set of senses 902 is depicted in FIG. 9. As depicted in the semantic proximity indicator data object 900 of FIG. 9, if a table entry corresponding to a particular word and a particular sense has the value of zero, then the noted word and the noted sense are not connected according to the semantic proximity data used to generate the semantic proximity indicator data object 900. For example, the first word and the first sense are not connected according to the semantic proximity data, as the table entry corresponding to the noted word-sense pair has the value of zero.

Moreover, as further depicted in the semantic proximity indicator data object 900 of FIG. 9, if a table entry corresponding to a particular word and a particular sense has the value of one, then the noted word and the noted sense are connected according to the semantic proximity data used to generate the semantic proximity indicator data object 900. For example, the first word and the third sense are connected according to the semantic proximity data, as the table entry corresponding to the noted word-sense pair has the value of one.

At step/operation 603, the sense classifier unit 401E determines a semantic proximity value for the word and the sense based at least in part on the semantic proximity data. The semantic proximity value is a data object that describes a degree of sense separation between a corresponding word associated with the semantic proximity value and the corresponding sense associated with the semantic proximity value. In some embodiments, the semantic proximity value describes a degree of sense separation between nodes associated with a corresponding word and a corresponding sense within the dictionary representation.

In some embodiments, to generate each semantic proximity value for a word-sense pair, the sense classifier unit 401E assigns: (i) to each word-sense pair in first subset of word-sense pairs whose semantic proximity indicators describe that there is no requisite sense degree separation between corresponding words and senses for the noted first subset word-sense pairs, a semantic proximity value of zero; and (ii) to each word-sense pair in a remaining subset of word sense pairs whose semantic proximity indicators describe that there is a requisite sense degree separation between corresponding words and senses for the noted remaining subset word-sense pairs, a variable semantic proximity value based at least in part on the degree of sense separations between corresponding words and senses for the noted remaining subset word-sense pairs.

An operational example of a semantic proximity value data object 1000 that depicts semantic proximity values for the set of words 901 and the set of senses 902 is depicted in FIG. 10. As depicted in FIG. 10, the semantic proximity value data object 1000 does not include any values for those word-sense pairs that are deemed to have no requisite semantic connection according to the semantic proximity indicator data object 900 of FIG. 9. Thus, the semantic proximity value data object 1000 of FIG. 10 may be determined by assigning a variable value to each one-valued entry of the semantic proximity indicator data object 900 of FIG. 9 according to the degree of sense separation between a word associated with the one-valued entry and a sense associated with the one-valued entry.

At step/operation 604, the sense classifier unit 401E determines the word-sense probability score for the word and the sense based at least in part on the word frequency score for the word and the semantic proximity value for the word and the sense. In some embodiments, to generate the word-sense probability score for a word and a sense, the sense classifier unit 401E raises the word frequency score for the word to a power defined by the semantic proximity value for the word and the sense. In some embodiments, since the word frequency scores are values that are smaller than or equal to one, raising word frequency scores to a power defined by semantic proximity values causes higher semantic proximity values that describe less meaningful semantic relationships to decrease word-sense probability scores and vice versa. Accordingly, semantic proximity values may in some embodiments have a negative effect on word-sense probability scores, which enables rewarding more meaningful semantic relationships such as synonym relationships relative to less meaningful semantic relationships such as relationships between two words that are synonymous with a third word but are not synonymous with each other. By using this and related techniques, various embodiments of the present invention provide an efficient means of injecting predictive insights inferred from semantic relationship mapping data into frequency-based measures in order to provide a powerful means of simultaneously mapping semantic associations and frequency considerations.

If step/operation 603 is used to generate term-sense frequency scores for n-grams where n>=2, the word-sense frequency scores of the unigrams in an n-gram can be combined to generate a term frequency score for the n-gram. For example, to determine the term-sense frequency scores for a multi-gram consisting of words $\{w_1, w_2 \ldots w_n\}$ and a particular sense, the sense classifier unit 401E and the co-reference resolution unit 401F may determine a value $p(sense_i|w_1, w_2 \ldots w_n)$ based at least in part on the word-sense probability score of each of the words $\{w_1, w_2 \ldots w_n\}$.

In some embodiments, the sense classifier unit 401E may provide a graph-based sense overlap representation that describes relationships between sense associations of various words. An operational example of a sense overlap graph 1100 is depicted in FIG. 11. As depicted in the sense overlap graph 1100, each node of the graph corresponds to either a modeled word (e.g., node 1111 corresponding to word W2 and node 1115 corresponding to word W3) or a semantic label for a modeled word (e.g., node 1102 corresponding to the semantic label W2S3 for the word W2 in node 1111, node 1122 corresponding to the semantic label W2S2 for the word W2 in node 1111, and node 1121 corresponding to the semantic label W3S1 for the word W3 in node 1115). A dotted edge between two nodes that correspond to two words (e.g., edge 1103) indicates absence of any semantic relationships between semantic labels of the two words, while a solid edge between two nodes that correspond to two words (e.g., 1104) indicates presence of some semantic relationship between semantic labels of the two words. Moreover, positional intersection of two nodes that correspond to two semantic labels (e.g., positional intersection of nodes 1121 and 1122 that correspond to semantic labels W3S1 and W2S2 respectively) indicates presence of a semantic relationship between the two semantic labels.

Returning to FIG. 4, the process 400 continues when a co-reference resolution unit 401F of the NLP computing entity 106 performs co-reference resolution on the tokenized sentences to generate co-reference resolution data for the tokenized sentences. The co-reference resolution data may be a data object that describes, for each set of phrases used in the tokenized sentence deemed to refer to a common entity, one or more common labels for the common entity.

To perform co-reference resolution on the document, the co-reference resolution unit 401F may utilize one or more machine learning modules, such as one or more machine learning modules configured to perform natural language processing. For example, the co-reference resolution unit 401F may utilize machine learning frameworks that use one or more of support vector machines, neural networks (including feed-forward neural networks and/or recurrent neural networks), maximum entropy classifiers, and/or the like. In some embodiments, the co-reference resolution unit 401F may utilize one or more existing co-reference resolution software solutions, such as CoreNLP, Reconcile, GuiTAR, Illinois Conference Package, CherryPicker, OpenNLP, ARKref, and/or the like.

In some embodiments, to perform co-reference resolution on a document, the co-reference resolution unit 401F replaces each of at least some of two or more words in a document that refer to a common entity and/or phenomenon with a descriptive word that refers to the common entity and/or phenomenon. For example, the co-reference resolution unit 401F may process a document to replace an initial sentence "Harry told me to call him" in the document with a transformed sentence "Harry told me to call Harry." To perform the noted transformation, the co-reference resolution unit 401F may first detect (e.g., using one or more natural language processing (NLP) modules) that the co-referencing word "Harry" and the co-referencing word "him" in the initial sentence both refer to a common entity. In response to the noted detection, the co-reference resolution unit 401F may determine that "Harry" is a more descriptive word for the common entity, and thus replace the co-referencing word "him" with the co-referencing word "Harry" in the initial sentence to generate the transformed sentence. As another example, the co-reference resolution unit 401F may process a document to replace an initial sentence "David said he hurt his knee" with a transformed sentence "David said David hurt David's knee." To perform the noted transformation, the co-reference resolution unit 401F may first detect that the words "David," "he," and "his" in the initial sentence refer to a common entity. In response to the noted detection, the co-reference resolution unit 401F may determine that "David" and "David's" are suitable descriptive words for the common entity to replace the co-referencing words "he" and "his" respectively. Thereafter, the co-reference resolution unit 401F may replace the word "he" in the initial sentence with the word "David" and the word "his" in the initial sentence with the word "David's" to generate the transformed sentence.

In some embodiments, if the co-reference resolution unit 401F detects that m words in one or more documents refer to a common entity and/or phenomenon, the co-reference resolution unit 401F determines one or more descriptive words for the common entity and/or phenomenon. The co-reference resolution unit 401F then transforms the one or more documents to ensure that each occurrence of the m words reflects one of the one or more descriptive words. For example, if the sole descriptive word for the common entity and/or phenomenon is one of the m words, the co-reference resolution unit 401F may replace all of occurrences of the m words with the exception of the occurrences of the descriptive word with the descriptive word. As another example, if the sole descriptive word for the common entity and/or phenomenon is not one of the m words, the co-reference resolution unit 401F may replace all occurrence of the m words without exception with the descriptive word.

By performing co-reference resolution, the co-reference resolution unit 401F may determine word frequency values that are more reflective of document semantic structures. For example, without co-reference resolution, the co-reference resolution unit 401F may conclude that the sentence "David said he hurt his knee" includes one occurrence of the word "David," one occurrence of the word "he," and one occurrence of the word "his." Because "he" and "his" are commonly used words, their respective individual frequencies may have relatively less significance in determining semantic properties of particular documents. In contrast, the cumulative frequency of the word "David" (i.e., three), which is a proper noun, may have considerably more significance in determining semantic properties of particular documents.

The process 400 continues when the context scoring unit 401G of the NLP computing entity 106 utilizes the word-sense probability data and the co-reference resolution data to determine sense-context modeling data for the document. The sense-context modeling data may be a data object that describes, for each tokenized word of the tokenized words: (i) a word-context-bucket correlation score describing an estimated degree of association between the tokenized word and a context bucket of one or more sense buckets, and (ii) word-sense-bucket correlation score describing an estimated degree of association between the tokenized word and a sense bucket of one or more sense buckets. A context bucket may be a collection of words deemed to have a strong association with a set of senses associated with the context bucket, while a sense bucket may be a set of senses deemed to have strong association (e.g., strong sense association) across the set of tokenized words.

In some embodiments, to determine sense-context modeling data for a particular word, the context scoring unit 401G may perform the steps/operations depicted in the process of FIG. 12. The process depicted in FIG. 12 begins at step/operation 1201 when the context scoring unit 401G determines one or more context buckets. In some embodiments, the context scoring unit 401G determines n context buckets each associated with a set of one or more senses, where the value of n may be determined using configuration data associated with the context scoring unit 401G and/or based at least in part on an automated configuration routine that seeks to balance granularity of context buckets and a level of summarization of an input set of documents. In some embodiments, a context bucket associated with a set of senses may include each word whose combined measure of word-sense probability score relative to the set of senses associated with context bucket exceeds a threshold measure. Operational examples of context buckets such as context bucket 1301 and context bucket 1302 are depicted in FIG. 13.

In some embodiments, to determine a context bucket, the context scoring unit 401G detects a set of senses having sufficiently similar word-sense probability scores across a common set of words, and associates the detected set of senses and the common set of words with a context bucket. In some embodiments, to determine a context bucket, the context scoring unit 401G detects the words whose word-sense probability scores relative to a particular sense exceeds a threshold word-sense probability score, and associates the detected words and the particular sense with the context bucket.

For example, as depicted in the sense overlap data object 1400 of FIGS. 14A, 14B, 14C, and 14D, the context bucket associated with the second sense 1401 may include at least some of the first word, the second word, the seventh word, the twelfth word, the thirteenth word, the fourteenth word, and the sixteenth word, which are the only non-zero word-sense probability scores for the second sense 1401. In some embodiments, determining a context bucket of the one or more context buckets comprises identifying the one or more context-related senses associated with the context bucket; for each word of a plurality of words, determining a context association score between the word and the one or more context-related senses based at least in part on each word-sense probability score associated with the word and with one of the one or more context-related senses; and determining the context bucket based at least in part on a bucket-related subset of the plurality of words whose context association score exceeds a context association score threshold.

At step/operation 1202, the context scoring unit 401G determines one or more sense buckets. In some embodiments, the context scoring unit 401G determines n sense buckets, where the value of n may be determined using configuration data associated with the context scoring unit 401G and/or based at least in part on automated configuration routine that seeks to balance granularity of sense buckets and a level of summarization of an input set of documents. In some embodiments, a sense bucket is associated with a set of senses deemed to have strong association (e.g., strong sense overlap) with one another. Operational examples of sense buckets such as sense bucket 1501 and sense bucket 1502 are presented in FIG. 15.

In some embodiments, determining the one or more sense buckets comprises: for each sense-sense pair of a first sense of a plurality of senses and a second sense of the plurality of senses, determining an odds ratio describing a strength of association between the first sense and the second sense based at least in part on each word-pair probability score associated with the first sense and each word-probability score associated with the second sense; determining whether the odds ratio exceeds an odds ratio threshold; and in response to determining that the odds ratio exceeds the odds ration threshold, causing the first sense and the second sense to be in a same sense bucket of the one or more sense buckets.

In some embodiments, a sense bucket including two or more senses is generated if the odds ratio for each pair of senses from the two or more senses is an above-threshold ratio. For example, if the above-threshold odds ratios for a set of senses {S1, S2, S3} include the odds ratio for S1 and S2 as well as the odds ratio for S2 and S3, then the sense buckets formed for the set of senses may include a first sense bucket [S1, S2] and a second sense bucket [S2, S3]. However, if the above-threshold odds ratios for a set of senses {S1, S2, S3} include the odds ratio for S1 and S2, the odds ratio for S1 and S3, and the odds ratio for S2 and S3, then the sense buckets formed for the set of senses may include the sole sense bucket [S1, S2, S3].

In some embodiments, to determine the odds ratio for two senses S0 and S1, the context scoring unit 401G performs the operations described by the below equation:

$$\frac{p_{11}/(p_{11}+p_{10})}{p_{10}/(p_{11}+p_{10})} \Big/ \frac{p_{01}/(p_{01}+p_{00})}{p_{00}/(p_{01}+p_{00})} = \frac{p_{11}p_{00}}{p_{10}p_{01}} \qquad \text{Equation 3}$$

In Equation 3, $p_{11}$ is a joint probability of S0 and S1 both belonging to a particular sense bucket, $p_{00}$ is a joint probability of S0 and S1 both not belonging to the particular sense bucket, $p_{10}$ is the joint probability of S1 belonging to the particular sense bucket but S0 not belonging to the particular sense bucket, and $p_{01}$ is the joint probability of S1 not belonging to the particular sense bucket but S0 belonging to the particular sense bucket.

At step/operation 1203, the context scoring unit 401G determines a word-context-bucket correlation score for the particular word relative to each of the one or more context buckets. In some embodiments, to determine a word-context-bucket correlation score for the particular word relative to a particular context bucket, the context scoring unit 401G processes (e.g., combines and/or sums) each word-sense probability score that is associated both with the particular word and a sense that is associated with the particular context bucket to generate a corresponding word-context-bucket probability score for the particular word and the particular context bucket.

In some embodiments, the context scoring unit 401G utilizes the word-context-bucket probability score for a particular word and a particular context bucket to generate the word-context-bucket correlation score for the particular word and the particular context bucket. For example, the context scoring unit 401G may adopt the word-context-bucket probability score for a particular word and a particular context bucket as the word-context-bucket correlation score for the particular word and the particular context bucket. As another example, the context scoring unit 401G may adopt a ratio of the word-context-bucket probability score for a particular word and a particular context bucket divided by other word-context-bucket probability scores associated with the particular word and other context buckets as the word-context-bucket correlation score for the particular word and the particular context bucket.

At step/operation 1204, the context scoring unit 401G determines a word-sense-bucket correlation score for the particular word relative to each of the one or more context sense. In some embodiments, to determine a word-sense-bucket correlation score for the particular word relative to a particular sense bucket, the context scoring unit 401G processes (e.g., combines and/or sums) each word-sense probability score that is associated both with the particular word and a sense that is associated with the particular sense bucket to generate a word-sense-bucket probability score for the particular word and the particular sense bucket.

In some embodiments, the context scoring unit 401G utilizes the word-context-bucket probability score for a particular word and a particular sense bucket to generate the word-sense-bucket correlation score for the particular word and the particular context bucket. For example, the context scoring unit 401G may adopt the word-sense-bucket probability score for a particular word and a particular sense bucket as the word-sense-bucket correlation score for the particular word and the particular sense bucket. As another example, the context scoring unit 401G may adopt a ratio of the word-sense-bucket probability score for a particular word and a particular sense bucket and other word-sense-bucket probability scores associated with the particular words divided by other sense buckets as the word-context-bucket correlation score for the particular word and the particular context bucket.

Returning to FIG. 4, the process 400 continues when a per-word sense-context determination unit 401H of the NLP computing entity 106 generates a per-word sense-context determination for each tokenized word in the document based at least in part on each word-context-bucket correlation score that is associated with the tokenized word as well as each word-sense-bucket correlation score that is associated with the tokenized word. In some embodiments, the per-word sense-context determination unit 401H aggregates word-context-bucket correlation scores for a particular word across context buckets as well as each word-sense-bucket correlation score for the particular word across sense buckets to generate the per-word sense-context determination for the particular word.

The process 400 continues when a per-sentence sense-context determination unit 401I of the NLP computing entity 106 generates a per-sentence sense-context determination for each tokenized sentence in the document based at least in part on each per-word sense-context determination for each tokenized word that is in the tokenized sentence. In some embodiments, the per-sentence sense-context determination unit 401I aggregates each per-word sense-context determination for a tokenized word that is in the tokenized sentence to generate the per-sentence sense-context determination for the tokenized sentence.

The process 400 continues when a per-document sense-context determination unit 401J of the NLP computing entity 106 generates a per-document sense-context determination for the document based at least in part on each per-sentence sense-context determination for a tokenized sentence that is in the document. In some embodiments, the per-document sense-context determination unit 401J aggregates each per-sentence sense-context determination for a tokenized sentence that is in the document to generate the per-document sense-context determination for the document.

The process 400 continues when a contextual summarization unit 401K of the NLP computing entity 106 generates a contextual summarization of the document based at least in part on at least one of each per-word sense-context determination for a tokenized word, each per-sentence sense-context determination for a tokenized sentence, and the per-document sense-context determination for the document. In some embodiments, a contextual summarization is a data object that describes a set of sense associations of document labels of a corresponding document as well as a set of context associations of key terms used in the corresponding document. Operational examples of contextual summarizations generated by the contextual summarization unit 401K include the graph-based contextual summarization 1600 of FIG. 16 and the word-cloud-based contextual summarization 1700 of FIG. 17, both of which are described below. Other examples of contextual summarization graphs determined based on document-wide contextual summarizations include hierarchical contextual summarization graphs and agglomerative contextual summarization graphs.

The graph-based contextual summarization 1600 of FIG. 16 depicts sense buckets using dashed segments (e.g., dashed segment 1601) around words that are deemed associated with each sense bucket. Furthermore, the graph-based contextual summarization 1600 depicts context buckets using coloring schemes identified in the sidebar 1602 of the graph-based contextual summarization 1600. Moreover, the graph-based contextual summarization 1600 depicts joint probability scores (e.g., joint probability score 1603) for words that are not necessarily in the same sense bucket using numbers associated with edges between those particular nodes.

The word-cloud-based contextual summarization 1700 of FIG. 17 depicts sense buckets by positioning words associated with the same sense bucket in a contiguous segment of the word-cloud-based contextual summarization space, such as within the contiguous segment 1701 of the word-cloud-based contextual summarization space. Furthermore, the word-cloud-based contextual summarization 1700 depicts context buckets by coloring words associated with each context bucket with a color that is specific to the context bucket, including coloring multi-context words associated with two or more context buckets with a color that is deemed a median color (e.g., a merger of) the colors associated with the two or more context buckets associated with such multi-context words. Moreover, the word-cloud-based contextual summarization 1700 depicts words having greater significance (e.g., lower frequency scores and/or higher TF-IDF scores) relative to a summarized document using bigger fonts, thus utilizing font sizes to provide additional data about distribution of words across summarized documents.

Returning to FIG. 4, the process 400 ends when a query processing unit 401L of the NLP computing entity 106 processes a query in accordance with the contextual summarization. In some embodiments, the query processing unit 401L is configured to receive search queries across a set of documents, generate a contextual summarization for each document in the set of documents, and utilize comparisons across contextual summarizations of documents to generate query outputs. In some embodiments, the query processing unit 401L is configured to receive classification queries configured to classify a particular document into one or more classes, generate a contextual summarization for the particular document, and perform comparisons across the contextual summarization of the particular document and contextual summarizations of already-classified documents to generate a classification for the document. In some embodiments, the query processing unit 401L is configured to receive a query for displaying a contextual summarization for a particular document and transmit contextual summarization interface data describing a contextual summarization interface that comprises the contextual summarization to a query-initiating device.

In some embodiments, the query processing unit 401L is configured to perform one or more document processing actions using the contextual summarization. In some embodiments, performing the one or more document processing actions comprises receiving a search query from a query-initiating device, where the query is targeted toward a set of candidate documents comprising the document; processing the query in accordance with the contextual summarization to generate a query relevance score for the document; generating a query output for the query based at least in part on the query relevance score; and providing the query output to the query-initiating device. In some embodiments, performing the one or more document processing actions comprises transmitting contextual summarization interface data to a contextual summarization interface that comprises the contextual summarization to a requesting computing device.

An operational example of a query output 1800 generated by the query processing unit 401L is depicted in FIG. 18. As depicted in FIG. 18, the query output 1800 includes results of a query. As further depicted in FIG. 18, the query output 1800 enables, by using the stage selection functionality enabled by the user interface element 1801, refining displayed query results based at least in part on contextual and/or sense-based filtering operations. Moreover, the query output 1800 enables, by using the per-document refinement functionality enabled by user interface elements such as user interface element 1802, refining displayed query results based at least in part on cross-document similarity determinations performed using contextual summarizations of a repository of documents.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for contextual summarization of a document, the computer-implemented method comprising:
    for each word-sense pair of a plurality of word-sense pairs, determining a word-sense probability score, wherein (i) each word-sense pair is associated with a word of a first plurality of words in the document and a sense of a plurality of senses, and (ii) the plurality of senses is associated with a second plurality of words in the document;
    determining, based at least in part on each word-sense probability score, one or more context buckets for the document and one or more sense buckets for the document, wherein: (i) each context bucket comprises a bucketed subset of the plurality of words deemed correlated with one or more context-related senses of the plurality of senses that is correlated with the context bucket; (ii) each sense bucket comprises a bucketed subset of the plurality of senses deemed correlated across the plurality of senses, and (iii) determining each context bucket of the one or more context buckets comprises:
        identifying the one or more context-related senses correlated with the context bucket,
        for each word of the plurality of words, determining a context association score between the word and the one or more context-related senses based at least in part on each word-sense probability score associated with the word and with one of the one or more context-related senses, and
        determining the context bucket based at least in part on a bucket-related subset of the plurality of words whose context association scores satisfy a context association score threshold;
    determining, based at least in part on the one or more context buckets for the document and the one or more sense buckets for the document, the contextual summarization of the document; and
    initiating the performance of one or more document processing actions based at least in part on the contextual summarization.

2. The computer-implemented method of claim 1 further comprising identifying the plurality of senses by:
    determining a dictionary representation of a semantic domain associated with the document, wherein the dictionary representation comprises a plurality of mapped senses;
    determining a proximate subset of the plurality of mapped senses, wherein each mapped sense in the proximate subset is within a threshold degrees of sense separation from at least one of the plurality of words; and
    determining a plurality of subsets based at least in part on the proximate subset.

3. The computer-implemented method of claim 1 further comprising identifying the plurality of words by:
    performing sentence tokenization on the document to generate one or more tokenized sentences;
    performing word tokenization on the one or more tokenized sentences to generate one or more tokenized words; and
    determining the plurality of words based at least in part on the one or more tokenized words.

4. The computer-implemented method of claim 1, wherein determining the word-sense probability score for the word and the sense comprises:
    determining a word frequency score for the word;
    determining a semantic proximity value for the word and the sense based at least in part on a degree of sense separation between the word and the sense as described by a dictionary representation of a semantic domain associated with the document; and
    determining the word-sense probability score based at least in part on the word frequency score and the semantic proximity value.

5. The computer-implemented method of claim 1, wherein determining the one or more sense buckets comprises:
    for each sense-sense pair of a first sense of the plurality of senses and a second sense of the plurality of senses, determining an odds ratio describing a strength of association between the first sense and the second sense based at least in part on each word-pair probability score associated with the first sense and each word-probability score associated with the second sense;
    determining whether the odds ratio satisfies an odds ratio threshold; and in response to determining that the odds ratio satisfies the odds ration threshold, causing the first sense and the second sense to be in a same sense bucket of the one or more sense buckets.

6. The computer-implemented method of claim 1, wherein determining the contextual summarization of the document comprises:

for each word-context-bucket pair of a plurality of word-context-bucket pairs comprising a word of the plurality of words and a context bucket of the one or more context buckets, determining a word-context-bucket correlation score based at least in part on each word-score probability score that is associated with the word and at least one of the one or more context-related senses for the context bucket;

for each word-sense-bucket pair of a plurality of word-sense-bucket pairs comprising a word of the plurality of words and a sense bucket of the one or more sense buckets, determining a word-sense-bucket correlation score based at least in part on each word-score probability score that is associated with the word and at least one of the bucketed subsets for the sense bucket;

determining a per-word sense-context determination for each word of the plurality of words based at least in part on each word-context-bucket correlation score for a word-context-bucket pair of the plurality of word-context-bucket pairs that is associated with the word and each word-sense-bucket correlation score for a word-sense-bucket pair of the plurality of word-sense-bucket pairs that is associated with the word;

determining a per-sentence sense-context determination for each sentence of one or more sentences of the document based at least in part on each per-word sense-bucket model for a word of the plurality of words that is in the sentence; and determining the contextual summarization based at least in part on each per-sentence sense-context determination for a sentence of the one or more sentences.

7. The computer-implemented method of claim 1, wherein initiating the performance of one or more document processing actions comprises:

receiving a search query from a query-initiating device, wherein the query is targeted toward a set of candidate documents comprising the document;

processing the query in accordance with the contextual summarization to determine a query relevance score for the document;

generating a query output for the query based at least in part on the query relevance score; and providing the query output to the query-initiating device.

8. An apparatus for contextual summarization of a document, the apparatus comprising at least one processor and at least one memory including program code, the at least one memory and the program code configured to, with the processor, cause the apparatus to at least:

for each word-sense pair of a plurality of word-sense pairs, determine a word-sense probability score, wherein (i) each word-sense pair is associated with a word of a first plurality of words in the document and a sense of a plurality of senses, and (ii) the plurality of senses is associated with a second plurality of words in the document;

determine, based at least in part on each word-sense probability score, one or more context buckets for the document and one or more sense buckets for the document, wherein: (i) each context bucket comprises a bucketed subset of the plurality of words deemed correlated with one or more context-related senses of the plurality of senses that is correlated with the context bucket; (ii) each sense bucket comprises a bucketed subset of the plurality of senses deemed correlated across the plurality of senses, and (iii) determining each context bucket of the one or more context buckets comprises:

identifying the one or more context-related senses correlated with the context bucket, for each word of the plurality of words, determining a context association score between the word and the one or more context-related senses based at least in part on each word-sense probability score associated with the word and with one of the one or more context-related senses, and determining the context bucket based at least in part on a bucket-related subset of the plurality of words whose context association scores satisfy a context association score threshold;

determine, based at least in part on the one or more context buckets for the document and the one or more sense buckets for the document, the contextual summarization of the document; and initiate the performance of one or more document processing actions based at least in part on the contextual summarization.

9. The apparatus of claim 8, wherein the at least one memory and the program code configured to, with the processor, further cause the apparatus to at least identify the plurality of senses by:

determining a dictionary representation of a semantic domain associated with the document, wherein the dictionary representation comprises a plurality of mapped senses;

determining a proximate subset of the plurality of mapped senses, wherein each mapped sense in the proximate subset is within a threshold degrees of sense separation from at least one of the plurality of words; and determining a plurality of subsets based at least in part on the proximate subset.

10. The apparatus of claim 9, wherein the at least one memory and the program code configured to, with the processor, further cause the apparatus to at least identify the plurality of words by:

performing sentence tokenization on the document to generate one or more tokenized sentences;

performing word tokenization on the one or more tokenized sentences to generate one or more tokenized words; and determining the plurality of words based at least in part on the one or more tokenized words.

11. The apparatus of claim 8, wherein determining the word-sense probability score for the word and the sense comprises:

determining a word frequency score for the word;

determining a semantic proximity value for the word and the sense based at least in part on a degree of sense separation between the word and the sense as described by a dictionary representation of a semantic domain associated with the document; and determining the word-sense probability score based at least in part on the word frequency score and the semantic proximity value.

12. The apparatus of claim 8, wherein determining the one or more sense buckets comprises:

for each sense-sense pair of a first sense of the plurality of senses and a second sense of the plurality of senses, determining an odds ratio describing a strength of association between the first sense and the second sense based at least in part on each word-pair probability score associated with the first sense and each word-probability score associated with the second sense;

determining whether the odds ratio satisfies an odds ratio threshold; and in response to determining that the odds ratio satisfies the odds ration threshold, causing the first sense and the second sense to be in a same sense bucket of the one or more sense buckets.

13. The apparatus of claim 8, wherein determining the contextual summarization of the document comprises:

for each word-context-bucket pair of a plurality of word-context-bucket pairs comprising a word of the plurality of words and a context bucket of the one or more context buckets, determining a word-context-bucket correlation score based at least in part on each word-score probability score that is associated with the word and at least one of the one or more context-related senses for the context bucket;

for each word-sense-bucket pair of a plurality of word-sense-bucket pairs comprising a word of the plurality of words and a sense bucket of the one or more sense buckets, determining a word-sense-bucket correlation score based at least in part on each word-score probability score that is associated with the word and at least one of the bucketed subsets for the sense bucket;

determining a per-word sense-context determination for each word of the plurality of words based at least in part on each word-context-bucket correlation score for a word-context-bucket pair of the plurality of word-context-bucket pairs that is associated with the word and each word-sense-bucket correlation score for a word-sense-bucket pair of the plurality of word-sense-bucket pairs that is associated with the word;

determining a per-sentence sense-context determination for each sentence of one or more sentences of the document based at least in part on each per-word sense-bucket model for a word of the plurality of words that is in the sentence; and determining the contextual summarization based at least in part on each per-sentence sense-context determination for a sentence of the one or more sentences.

14. The apparatus of claim 8, wherein initiating the performance of one or more document processing actions comprises:

receiving a search query from a query-initiating device, wherein the query is targeted toward a set of candidate documents comprising the document;

processing the query in accordance with the contextual summarization to determine a query relevance score for the document;

generating a query output for the query based at least in part on the query relevance score; and providing the query output to the query-initiating device.

15. A computer program product for contextual summarization of a document, the computer program product comprising at least one non-transitory computer-readable storage medium having computer-readable program code portions stored therein, the computer-readable program code portions configured to:

for each word-sense pair of a plurality of word-sense pairs, determine a word-sense probability score, wherein (i) each word-sense pair is associated with a word of a first plurality of words in the document and a sense of a plurality of senses, and (ii) the plurality of senses is associated with a second plurality of words in the document;

determine, based at least in part on each word-sense probability score, one or more context buckets for the document and one or more sense buckets for the document, wherein: (i) each context bucket comprises a bucketed subset of the plurality of words deemed correlated with one or more context-related senses of the plurality of senses that is correlated with the context bucket; (ii) each sense bucket comprises a bucketed subset of the plurality of senses deemed correlated across the plurality of senses, and (iii) determining each context bucket of the one or more context buckets comprises:

identifying the one or more context-related senses correlated with the context bucket, for each word of the plurality of words, determining a context association score between the word and the one or more context-related senses based at least in part on each word-sense probability score associated with the word and with one of the one or more context-related senses, and determining the context bucket based at least in part on a bucket-related subset of the plurality of words whose context association scores satisfy a context association score threshold;

determine, based at least in part on the one or more context buckets for the document and the one or more sense buckets for the document, the contextual summarization of the document; and initiate the performance of one or more document processing actions based at least in part on the contextual summarization.

16. The computer program product of claim 15 wherein determining the word-sense probability score for the word and the sense comprises:

determining a word frequency score for the word;

determining a semantic proximity value for the word and the sense based at least in part on a degree of sense separation between the word and the sense as described by a dictionary representation of a semantic domain associated with the document; and determining the word-sense probability score based at least in part on the word frequency score and the semantic proximity value.

17. The computer program product of claim 15, wherein determining the contextual summarization of the document comprises:

for each word-context-bucket pair of a plurality of word-context-bucket pairs comprising a word of the plurality of words and a context bucket of the one or more context buckets, determining a word-context-bucket correlation score based at least in part on each word-score probability score that is associated with the word and at least one of the one or more context-related senses for the context bucket;

for each word-sense-bucket pair of a plurality of word-sense-bucket pairs comprising a word of the plurality of words and a sense bucket of the one or more sense buckets, determining a word-sense-bucket correlation score based at least in part on each word-score probability score that is associated with the word and at least one of the bucketed subsets for the sense bucket;

determining a per-word sense-context determination for each word of the plurality of words based at least in part on each word-context-bucket correlation score for a word-context-bucket pair of the plurality of word-context-bucket pairs that is associated with the word and each word-sense-bucket correlation score for a word-sense-bucket pair of the plurality of word-sense-bucket pairs that is associated with the word;

determining a per-sentence sense-context determination for each sentence of one or more sentences of the document based at least in part on each per-word sense-bucket model for a word of the plurality of words that is in the sentence; and determining the contextual summarization based at least in part on each per-sentence sense-context determination for a sentence of the one or more sentences.

\* \* \* \* \*